US007953880B2

(12) United States Patent
Deshpande

(10) Patent No.: US 7,953,880 B2
(45) Date of Patent: May 31, 2011

(54) CONTENT-AWARE ADAPTIVE PACKET TRANSMISSION

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1042 days.

(21) Appl. No.: 11/560,457

(22) Filed: Nov. 16, 2006

(65) Prior Publication Data

US 2008/0120424 A1  May 22, 2008

(51) Int. Cl.
*G06F 15/16* (2006.01)
(52) U.S. Cl. ......... 709/231; 709/230; 370/395; 370/335
(58) Field of Classification Search .................. 709/231, 709/230; 370/395, 335
See application file for complete search history.

(56) References Cited

U.S. PATENT DOCUMENTS

| | | | |
|---|---|---|---|
| 5,392,280 A | 2/1995 | Zheng | |
| 5,802,311 A | 9/1998 | Wronski | |
| 6,031,584 A | 2/2000 | Gray | |
| 6,157,674 A | 12/2000 | Oda et al. | |
| 6,351,471 B1 | 2/2002 | Robinett et al. | |
| 6,498,865 B1 | 12/2002 | Brailean et al. | |
| 6,609,149 B1 | 8/2003 | Bandera et al. | |
| 6,747,991 B1 | 6/2004 | Hemy et al. | |
| 6,996,061 B2 * | 2/2006 | Yang et al. | 370/233 |
| 7,002,985 B2 | 2/2006 | Dertz et al. | |
| 7,263,064 B2 * | 8/2007 | Yoshimura et al. | 370/235 |
| 7,385,954 B2 * | 6/2008 | Gopalakrishnan et al. | 370/335 |
| 2002/0093930 A1 | 7/2002 | Dertz et al. | |
| 2002/0131443 A1 | 9/2002 | Robinett et al. | |
| 2003/0233464 A1 | 12/2003 | Walpole et al. | |
| 2003/0236904 A1 | 12/2003 | Walpole et al. | |
| 2004/0125816 A1 | 7/2004 | Xu et al. | |
| 2004/0136409 A1 | 7/2004 | Robinett et al. | |
| 2004/0194142 A1 | 9/2004 | Jiang et al. | |
| 2005/0013303 A1 * | 1/2005 | Gopalakrishnan et al. | 370/395.21 |
| 2005/0071876 A1 | 3/2005 | Van Beek | |
| 2005/0105486 A1 | 5/2005 | Robinett et al. | |
| 2005/0169312 A1 | 8/2005 | Cakareski et al. | |
| 2006/0026294 A1 | 2/2006 | Virdi et al. | |
| 2006/0095943 A1 | 5/2006 | Demircin et al. | |
| 2006/0095944 A1 | 5/2006 | Demircin et al. | |

(Continued)

FOREIGN PATENT DOCUMENTS

EP  1 432 183 A2  6/2004

(Continued)

OTHER PUBLICATIONS

The ns Manual (formerly ns Notes and Documentation), The VINT Project, [online], [retreived on Jun. 2, 2006]. Retrieved from the Internet<URL:http://www.isi.edu/nsnam/ns/>.

(Continued)

*Primary Examiner* — Tammy T Nguyen
(74) *Attorney, Agent, or Firm* — Michael Blaine Brooks, PC; Michael B. Brooks; David Ripma

(57) ABSTRACT

The embodiments of the invention relate to video streaming, particularly adaptive and selective transmissions, for example, based on feedback reports received from receivers. The feedback reports are used to determine transmission rates and which content elements within the transmission buffer, for example, are to be dropped or not sent by the sender, and which are to be sent.

25 Claims, 22 Drawing Sheets

U.S. PATENT DOCUMENTS

| | | | |
|---|---|---|---|
| 2006/0153217 | A1 | 7/2006 | Chu et al. |
| 2006/0164987 | A1 | 7/2006 | Ruiz Floriach et al. |
| 2006/0165088 | A1 | 7/2006 | Monta et al. |
| 2007/0058557 | A1 | 3/2007 | Cuffaro et al. |
| 2008/0120424 | A1* | 5/2008 | Deshpande .................. 709/230 |

FOREIGN PATENT DOCUMENTS

| | | |
|---|---|---|
| EP | 1 619 839 A1 | 1/2006 |
| JP | 08256340 | 10/1996 |
| JP | 09312656 | 12/1997 |
| JP | 2002094533 | 3/2002 |
| WO | WO 03/041055 A1 | 5/2003 |
| WO | WO 2004/010250 A2 | 1/2004 |
| WO | WO 2004/056057 A2 | 7/2004 |
| WO | WO 2004/088858 A2 | 10/2004 |
| WO | WO 2005/029867 A1 | 3/2005 |
| WO | WO 2005/048606 A1 | 5/2005 |
| WO | WO 2005/101755 A1 | 10/2005 |
| WO | WO 2005/112449 A1 | 11/2005 |
| WO | WO 2006/061801 A1 | 6/2006 |
| WO | WO 2006/064454 A1 | 6/2006 |
| WO | WO 2006/067374 A1 | 6/2006 |

OTHER PUBLICATIONS

Kalman,Mark;Girod,Bernd; Van Beek, Peter,"Optimized Transcoding Rate Selection and Packet scheduling for Transmitting Multiple Video Streams Over a Shared Channel,"ICIP 2005.

Huang, Jie;Krasic, Charles;Walpole, Jonathan;Feng, Wu-Chi, "Adaptive Live Video Streaming by Priority Drop," OGI School of Science and Engineering, Packet Video 2003.

Chakareski, Jacob; Apostolopoulos, John; Girod, Bernd,"Low-Complexity Rate-Distortion Optimized Video Streaming,"ICIP 2004.

Schulzrinne,H. et al.,"RTP:A Transport Protocol for Real-Time Applications,"RFC3550, [online], [retrieved on Jun. 2, 2006].Retrieved from<URL:http://www.ietf.org/rfc/rfc3550.txt>.

Chou, Philip A., Miao, Zhouron,"Rate-Distortion Optimized Streaming of packetized Media," Technical Report MSR-TR-2001-35, Feb. 2001, Microsoft Research, Redding, CA.

Non-Final Office action for U.S. Appl. No. 11/738,313 dated Jun. 3, 2009.

Kalman, Mark and Girod, Bernd, "Rate-Distortion Optimized Video Streaming with Multiple Deadlines for Low Latency Applications,"Dec. 2004, Packet Video Workshop, Irvine,CA.

Sehgal, Anshul,Verscheure,Oliver and Frossard,Pascal,"Distortion-Buffer Optimized TCP Video Streaming,"IEEE ICP, Oct. 2004,Singapore.

Sehgal,Anshul,Jagmohan,Ashish,Verscheure,Oliver and Frossard,Pascal,"Fast Distortion-Buffer Optimized Streaming of Multimedia,"IEEE ICP, Sep. 2005, Genoa,Italy.

Notice of Allowance for U.S. Appl. No. 11/743,547 dated Oct. 6, 2009.

Notice of Allowance for U.S. Appl. No. 11/738,313 dated Dec. 10, 2009.

Kalman, M.,Steinbach,E.& Girod,B.,"Adaptive Media Playout for Low-Delay Video Streaming Over Error-Prone Channels,"IEEE Transactions, Jun. 2004,pp. 841-851,vol. 14,No. 6.

* cited by examiner

τ WORK SET 820

| SEQ NO. 812 | FR. TYPE 810 | FR. NO. 802 | TIME STAMP 804 | PRI. /IMP. 806 | # OF BITS (SIZE) 808 | |
|---|---|---|---|---|---|---|
| 1 | I | *fr1* | 33 | 6 | B1 | 822 |
| 2 | B | *fr2* | 66 | 1 | B2 | 824 |
| 3 | B | *fr3* | 100 | 1 | B3 | 826 |
| 4 | P | *fr4* | 133 | 5 | B4 | 828 |
| 5 | B | *fr5* | 166 | 1 | B5 | 830 |
| 6 | B | *fr6* | 200 | 1 | B6 | 832 |
| 7 | P | *fr7* | 233 | 4 | B7 | 834 |
| 8 | B | *fr8* | 266 | 1 | B8 | 836 |
| 9 | B | *fr9* | 300 | 1 | B9 | 838 |
| 10 | P | *fr10* | 333 | 3 | B10 | 840 |
| 11 | B | *fr11* | 366 | 1 | B11 | 842 |
| 12 | B | *fr12* | 400 | 1 | B12 | 844 |
| 13 | P | *fr13* | 433 | 2 | B13 | 846 |
| 14 | B | *fr14* | 466 | 1 | B14 | 848 |
| 15 | B | *fr15* | 500 | 1 | B15 | 850 |
| 16 | I | *fr16* | 533 | 6 | B16 | 852 |
| 17 | B | *fr17* | 566 | 1 | B17 | 854 |

FIG. 8A

τ WORK SET
IN PRIORITY-ORDER SEQUENCE 860

| SEQ NO. 812 | FR. TYPE 810 | FR. NO. 802 | TIME STAMP 804 | PRI. /IMP. 806 | # OF BITS (SIZE) 808 | |
|---|---|---|---|---|---|---|
| 1 | I | fr1 | 33 | 6 | B1 | 822 |
| 16 | I | fr16 | 533 | 6 | B16 | 852 |
| 4 | P | fr4 | 133 | 5 | B4 | 828 |
| 7 | P | fr7 | 233 | 4 | B7 | 834 |
| 10 | P | fr10 | 333 | 3 | B10 | 840 |
| 13 | P | fr13 | 433 | 2 | B13 | 846 |
| 2 | B | fr2 | 66 | 1 | B2 | 824 |
| 3 | B | fr3 | 100 | 1 | B3 | 826 |
| 5 | B | fr5 | 166 | 1 | B5 | 830 |
| 6 | B | fr6 | 200 | 1 | B6 | 832 |
| 8 | B | fr8 | 266 | 1 | B8 | 836 |
| 9 | B | fr9 | 300 | 1 | B9 | 838 |
| 11 | B | fr11 | 366 | 1 | B11 | 842 |
| 12 | B | fr12 | 400 | 1 | B12 | 844 |
| 14 | B | fr14 | 466 | 1 | B14 | 848 |
| 15 | B | fr15 | 500 | 1 | B15 | 850 |
| 17 | B | fr17 | 566 | 1 | B17 | 854 |

FIRST/RATE SUBSET 864

| SEQ NO. 812 | FR. TYPE 810 | FR. NO. 802 | TIME STAMP 804 | PRI. /IMP. 806 | # OF BITS (SIZE) 808 | |
|---|---|---|---|---|---|---|
| 1 | I | fr1 | 33 | 6 | B1 | 822 |
| 2 | B | fr2 | 66 | 1 | B2 | 824 |
| 3 | B | fr3 | 100 | 1 | B3 | 826 |
| 4 | P | fr4 | 133 | 5 | B4 | 828 |
| 5 | B | fr5 | 166 | 1 | B5 | 830 |
| 6 | B | fr6 | 200 | 1 | B6 | 832 |
| 7 | P | fr7 | 233 | 4 | B7 | 834 |
| 8 | B | fr8 | 266 | 1 | B8 | 836 |
| 9 | B | fr9 | 300 | 1 | B9 | 838 |
| 10 | P | fr10 | 333 | 3 | B10 | 840 |
| 13 | P | fr13 | 433 | 2 | B13 | 846 |
| 16 | I | fr16 | 533 | 6 | B16 | 852 |

866 → WILL NOT MEET DEADLINE

DROP SET: {fr6}

FIG. 8C

τ WORK SET FOR TRANSMISSION

| SEQ NO. 812 | FR. TYPE 810 | FR. NO. 802 | TIME STAMP 804 | PRI. /IMP. 806 | # OF BITS (SIZE) 808 | |
|---|---|---|---|---|---|---|
| 1 | I | fr1 | 33 | 6 | B1 | 822 |
| 2 | B | fr2 | 66 | 1 | B2 | 824 |
| 3 | B | fr3 | 100 | 1 | B3 | 826 |
| 4 | P | fr4 | 133 | 5 | B4 | 828 |
| 5 | B | fr5 | 166 | 1 | B5 | 830 |
| 7 | P | fr7 | 233 | 4 | B7 | 834 |
| 8 | B | fr8 | 266 | 1 | B8 | 836 |
| 9 | B | fr9 | 300 | 1 | B9 | 838 |
| 10 | P | fr10 | 333 | 3 | B10 | 840 |
| 11 | B | fr11 | 366 | 1 | B11 | 842 |
| 12 | B | fr12 | 400 | 1 | B12 | 844 |
| 13 | P | fr13 | 433 | 2 | B13 | 846 |
| 14 | B | fr14 | 466 | 1 | B14 | 848 |
| 15 | B | fr15 | 500 | 1 | B15 | 850 |
| 16 | I | fr16 | 533 | 6 | B16 | 852 |
| 17 | B | fr17 | 566 | 1 | B17 | 854 |

TOTAL FRAMES IN τ WORK SET
IN PRIORITY-ORDER SEQUENCE  868

| SEQ NO. 812 | FR. TYPE 810 | FR. NO. 802 | TIME STAMP 804 | PRI. /IMP. 806 | # OF BITS (SIZE) 808 | |
|---|---|---|---|---|---|---|
| 1 | I | fr1 | 33 | 6 | B1 | 822 |
| 16 | I | fr16 | 533 | 6 | B16 | 852 |
| 4 | P | fr4 | 133 | 5 | B4 | 828 |
| 7 | P | fr7 | 233 | 4 | B7 | 834 |
| 10 | P | fr10 | 333 | 3 | B10 | 840 |
| 13 | P | fr13 | 433 | 2 | B13 | 846 |
| 2 | B | fr2 | 66 | 1 | B2 | 824 |
| 3 | B | fr3 | 100 | 1 | B3 | 826 |
| 5 | B | fr5 | 166 | 1 | B5 | 830 |
| 8 | B | fr8 | 266 | 1 | B8 | 836 |
| 9 | B | fr9 | 300 | 1 | B9 | 838 |
| 11 | B | fr11 | 366 | 1 | B11 | 842 |
| 12 | B | fr12 | 400 | 1 | B12 | 844 |
| 14 | B | fr14 | 466 | 1 | B14 | 848 |
| 15 | B | fr15 | 500 | 1 | B15 | 850 |
| 17 | B | fr17 | 566 | 1 | B17 | 854 |

TOTAL FRAMES IN
IN TIMESTAMP-ORDER SEQUENCE 872

| SEQ NO. 812 | FR. TYPE 810 | FR. NO. 802 | TIME STAMP 804 | PRI. /IMP. 806 | # OF BITS (SIZE) 808 | |
|---|---|---|---|---|---|---|
| 1 | I | *fr1* | 33 | 6 | B1 | 822 |
| 2 | B | *fr2* | 66 | 1 | B2 | 824 |
| 3 | B | *fr3* | 100 | 1 | B3 | 826 |
| 4 | P | *fr4* | 133 | 5 | B4 | 828 |
| 5 | B | *fr5* | 166 | 1 | B5 | 830 |
| 7 | P | *fr7* | 233 | 4 | B7 | 834 |
| 8 | B | *fr8* | 266 | 1 | B8 | 836 |
| 9 | B | *fr9* | 300 | 1 | B9 | 838 |
| 10 | P | *fr10* | 333 | 3 | B10 | 840 |
| 11 | B | *fr11* | 366 | 1 | B11 | 842 |
| 12 | B | *fr12* | 400 | 1 | B12 | 844 |
| 13 | P | *fr13* | 433 | 2 | B13 | 846 |
| 16 | I | *fr16* | 533 | 6 | B16 | 852 |

892 { rows 1–13 }, 890 → row 13

**DROP SET: {*fr6, fr13*}**

FIG. 8F

TOTAL FRAMES IN τ WORK SET
IN PRIORITY-ORDER SEQUENCE                874

| SEQ NO. 812 | FR. TYPE 810 | FR. NO. 802 | TIME STAMP 804 | PRI. /IMP. 806 | # OF BITS (SIZE) 808 | |
|---|---|---|---|---|---|---|
| 1 | I | fr1 | 33 | 6 | B1 | 822 |
| 16 | I | fr16 | 533 | 6 | B16 | 852 |
| 4 | P | fr4 | 133 | 5 | B4 | 828 |
| 7 | P | fr7 | 233 | 4 | B7 | 834 |
| 10 | P | fr10 | 333 | 3 | B10 | 840 |
| 2 | B | fr2 | 66 | 1 | B2 | 824 |
| 3 | B | fr3 | 100 | 1 | B3 | 826 |
| 5 | B | fr5 | 166 | 1 | B5 | 830 |
| 8 | B | fr8 | 266 | 1 | B8 | 836 |
| 9 | B | fr9 | 300 | 1 | B9 | 838 |
| 11 | B | fr11 | 366 | 1 | B11 | 842 |
| 12 | B | fr12 | 400 | 1 | B12 | 844 |
| 14 | B | fr14 | 466 | 1 | B14 | 848 |
| 15 | B | fr15 | 500 | 1 | B15 | 850 |
| 17 | B | fr17 | 566 | 1 | B17 | 854 |

FILTERED SET: FRAMES TO BE TRANSMITTED 880

| SEQ NO. 812 | FR. TYPE 810 | FR. NO. 802 | TIME STAMP 804 | PRI. /IMP. 806 | # OF BITS (SIZE) 808 | |
|---|---|---|---|---|---|---|
| 1 | I | fr1 | 33 | 6 | B1 | 822 |
| 2 | B | fr2 | 66 | 1 | B2 | 824 |
| 3 | B | fr3 | 100 | 1 | B3 | 826 |
| 4 | P | fr4 | 133 | 5 | B4 | 828 |
| 5 | B | fr5 | 166 | 1 | B5 | 830 |
| 7 | P | fr7 | 233 | 4 | B7 | 834 |
| 8 | B | fr8 | 266 | 1 | B8 | 836 |
| 9 | B | fr9 | 300 | 1 | B9 | 838 |
| 10 | P | fr10 | 333 | 3 | B10 | 840 |
| 11 | B | fr11 | 366 | 1 | B11 | 842 |
| 12 | B | fr12 | 400 | 1 | B12 | 844 |
| 14 | B | fr14 | 466 | 1 | B14 | 848 |
| 15 | B | fr15 | 500 | 1 | B15 | 850 |
| 16 | I | fr16 | 533 | 6 | B16 | 852 |
| 17 | B | fr17 | 566 | 1 | B17 | 854 |

FIG. 8H

CONTENT-AWARE ADAPTIVE PACKET TRANSMISSION

FIELD OF THE INVENTION

The embodiments of the present invention relate to streaming data, particularly to packet transmission scheduling and source pruning.

BACKGROUND

With the proliferation of digital data, various multimedia source contents have been expected to come from various sources and various delivery mediums, including wide area networks, local area networks, broadcasts, cable, and pre-stored media. A multimedia stream, however, may be transmitted, for example, over network segments with varying link capacities. Ways of dynamically adapting a multimedia stream to varying network conditions are thus highly desirable for efficient transmission of the multimedia stream.

SUMMARY

In one aspect, a method of streaming a source content from a sender to a receiver via a network is provided. The source content includes a plurality of content elements. The method includes the steps of determining, by the sender, a transmission rate; determining, in priority index order, a first set of content elements based on a rate constraint for the receiver, wherein said first set of content elements is associated with content elements of said source content within a transmission buffer, and wherein said rate constraint is based on said determined transmission rate; and determining, in transmission order, whether each of said content elements in said determined first set of content elements meets its associated delay constraint, and, if said content element does not meet its said associated delay constraint, identifying said content element not meeting its said associated delay constraint as a drop content element.

In another aspect, a device adapted to be operably coupled to a network is provided. The device includes a transmission buffer, a rate-determination module, a selective dropping module, and a buffer transmitter module. The transmission buffer is adapted to store content elements associated with a source content that includes a plurality of content elements. The rate-determination module is adapted to determine a transmission rate. The selective dropping module is adapted to determine, in priority index order, a first set of content elements based on a rate constraint for the receiver, wherein said first set of content elements is associated with said content elements of said transmission buffer, and wherein said rate constraint is based on said determined transmission rate determined by said rate-determination module; and determine, in transmission order, whether each of said content elements in said determined first set of content elements meets its associated delay constraint, and, if said content element does not meet its said associated delay constraint, identify said content element not meeting its said associated delay constraint as a drop content element. The buffer transmitter module is adapted to transmit, in transmission order, a filtered set of content elements, wherein said filtered set comprising content elements of said transmission buffer without said content elements associated with said identified drop content elements.

In another aspect, a system is provided. The system includes a sender coupled to a receiver via one or more network segments and a receiver. The sender includes a transmission buffer, a rate-determination module, a selective dropping module, and a buffer transmitter module. The transmission buffer is adapted to store content elements associated with a source content, which includes a plurality of content elements. The rate-determination module is adapted to determine a transmission rate. The selective dropping module is adapted to determine, in priority index order, a first set of content elements based on a rate constraint for said receiver, wherein said first set of content elements is associated with said content elements of said transmission buffer, and wherein said rate constraint is based on said determined transmission rate determined by said rate-determination module; and determine, in transmission order, whether each of said content elements in said determined first set of content elements meets its associated delay constraint, and, if said content element does not meet its said associated delay constraint, identify said content element not meeting its said associated delay constraint as a drop content element. The buffer transmitter module is adapted to transmit to said receiver, in transmission order, a filtered set of content elements, wherein said filtered set comprising content elements of said transmission buffer without said content elements associated with said identified drop content elements. The receiver is adapted to receive and present said filtered set of content elements.

BRIEF DESCRIPTION OF THE DRAWINGS

The present invention is illustrated by way of example and not limitation in the figures of the accompanying drawings, and in which:

FIGS. 8A, 8B, 8C, 8D, 8E, 8F, 8G, and 8H illustrate exemplary tables representing exemplary content elements of exemplary transmission buffers, according to embodiments of the invention;

DETAILED DESCRIPTION

Figure 1:
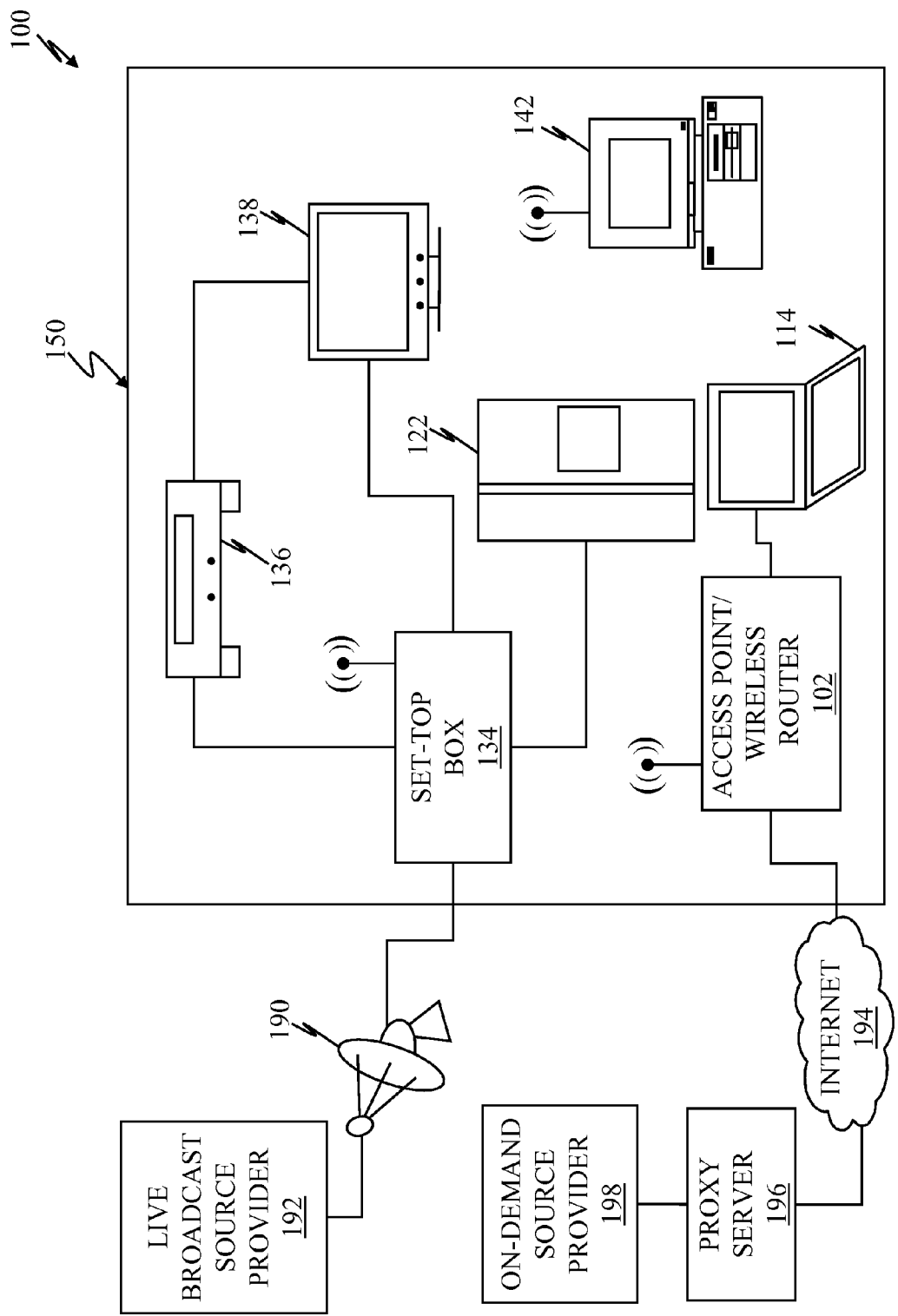
FIG. 1 is a high-level block diagram of an exemplary system according to an embodiment of the invention.
Figure 2:
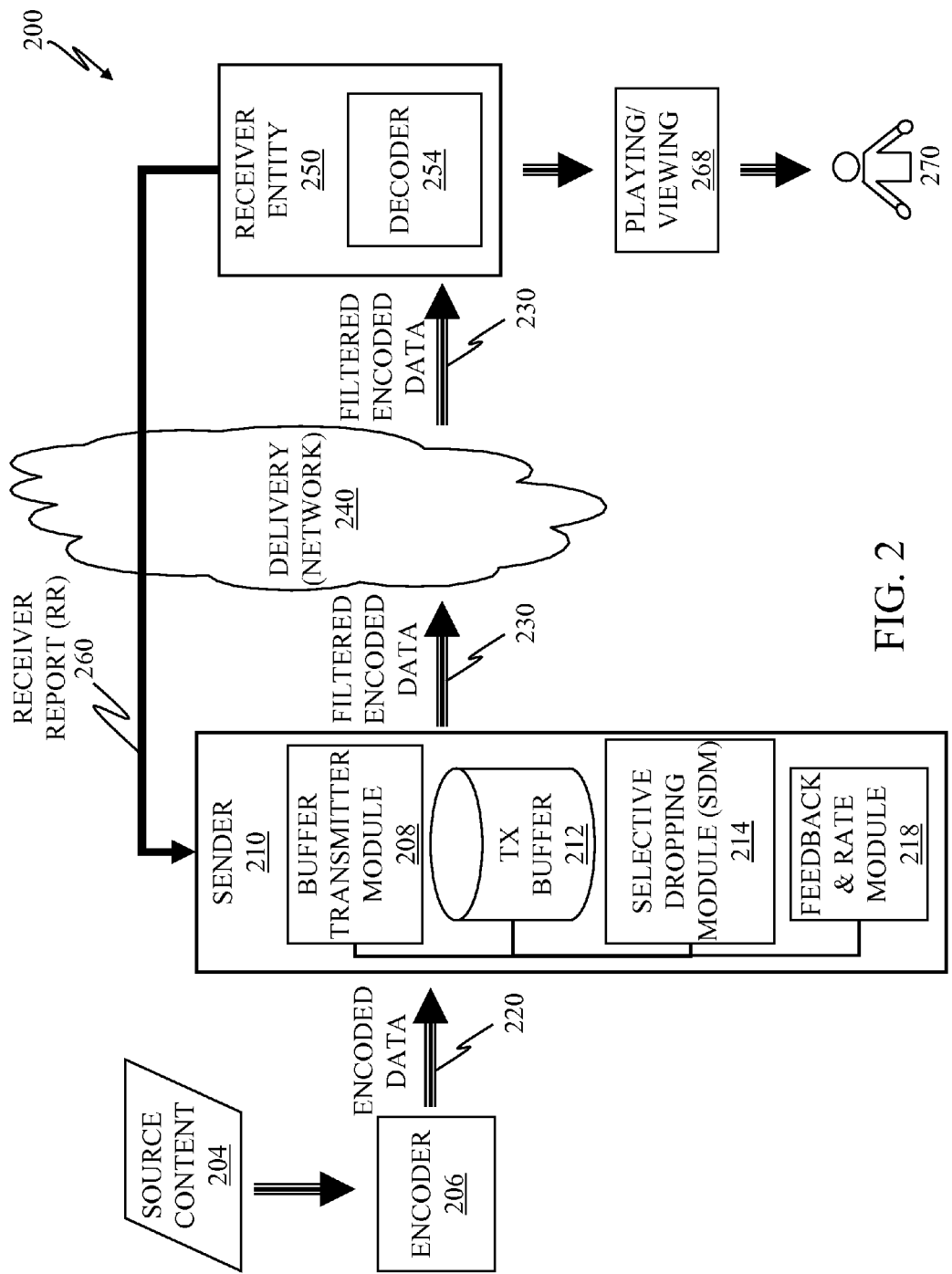
FIG. 2 is a high-level block diagram of an adaptive and selective streaming source content distribution or transmission system, according to an embodiment of the invention.

To better understand the figures, reference numerals within the one hundred series, for example, 134 and 190, are initially introduced in FIG. 1, reference numerals in the two hundred series, for example, 210 and 250, are initially introduced in FIG. 2, and so on and so forth. So, reference numerals in the eight hundred series, e.g., 826 and 830, are initially introduced in FIG. 8.

The embodiments of the present invention generally relate to streaming source content or media, such as video—both visual and audio, streaming visual data, streaming audio data, and streaming control data. Streaming media in general is the transfer of source content so that this content may be received as a continuous real-time stream. Streamed source content elements are typically transmitted by a sender, e.g., a server/server application or sender entity, and received by a receiver, e.g., client/client application or receiver entity. The receiver or client typically may start presenting or playing back the source content as soon as the receiving client application has sufficient data or content elements stored in its receiving buffer. The playback or presentation typically continues until the end of the presentation of the source content.

FIG. 1 is an exemplary diagram of a system 100 wherein digital source content, such as audio and/or visual/image, data, are transmitted or streamed according to some embodiments of the invention. In this exemplary embodiment, a local network 150 includes a number of consumer electronics, including a set-top box 134, a digital television (DTV) 138, a wireless personal computer (PC) 142, a digital video or versatile disc (DVD) player 136, a computer laptop 114, a gateway/router 102, and a consumer appliance/device 122, connected via various network links or segments. These various consumer electronics are typically adapted to be networked with each other. Examples of consumer appliances that may be networked into the system 100 include televisions and refrigerators with user interfaces, including displays, radios adapted to receive streaming source contents, and any other devices adapted to receive source contents via the network and present them accordingly. The local network 150 comprises various networks—e.g., power line communication (PLC) networks, 802.11a wireless networks, 802.11g wireless networks, and 802.11b wireless networks. Future network specifications such as 802.11n may also be incorporated in such networks. The local network 150 may be operably coupled to one or more source content providers 192, 198, for example, via satellite, cable, and/or terrestrial broadcast 190 or via an external wide area network, such as the Internet 194. A source content provider 192, 198 may provide pre-encoded and stored source content and/or live real-time or substantially real-time encoded source content to be received by a receiver/client and accordingly be presented in a user interface. For example, a movie may be requested from a source provider 198 that provides on-demand pre-encoded and stored data. The encoded source content is then transmitted and streamed over network segments, which may include wide, local, and/or metropolitan area network segments. This source content is then received by a set-top box 134, for example, via a home wireless network and presented by a digital television 138. In some embodiments, a source provider or an intermediate network node also has one or more proxy servers 196 that are operably connected to the source provider 198. A proxy server 196 thus may be a node in the system, for example, where source contents may directly or indirectly be requested. Although the receivers or clients of such streaming media content are depicted to be within a local area network, the embodiments of the invention may also apply to other types of receivers, for example, mobile devices adapted to receive and/or present wireless streaming source content. These wireless devices may also be incorporated in vehicles.

FIG. 2 is a high-level block diagram 200 showing an exemplary content-aware adaptive and selective streaming system for the delivery of streaming media or source content, which may be employed over variable bit-rate channels or links. The content-aware adaptive and selective system 200 of the present invention includes monitoring network conditions by utilizing feedbacks 260 from receivers, and dropping or filtering of encoded content elements, typically of a transmission buffer, in order to match a dynamically changing target bandwidth. The exemplary system 200 is also typically adapted to adjust transmission rates so as to match or adjust to receiver capacity and/or network congestion. The adaptive and selective transmission system, in some embodiments, prunes or filters the source content transmitted to the receiver. In other embodiments, components of the exemplary system may perform transrating and/or transcoding. In other embodiments, the adaptive system includes an iterative process that determines which content elements are to be dropped based on rate constraints and delay constraints of the network channel.

For illustrative purposes, let us assume that a media source provider 192, 198 is providing streaming source content to a consumer 270, which is presented 268 by a receiver 250. The original source content may have been previously captured or captured in real-time. In general, the original source content is captured 204 and then encoded 206 by an encoder module 206. The step of encoding 206 typically includes dividing the original source content 204 into one or more components, e.g., content elements, and compressing such components into one or more encoded source content elements. The structure, format, and/or data contained in the source content and the content elements may depend on the compression technology, e.g., codec or standard being supported. Examples of standards include Moving Picture Expert Group (MPEG) MPEG-2, MPEG-4, H.263, H.264, and Scalable Video Coding (SVC). The encoded source content elements of the source content are typically received and processed by a sender 210. The encoder module 206 and the sender module 210 may be embodied in separate or the same entities, such as devices or applications. For example, pre-encoded data 220 may be encoded and transmitted by a media provider to the sender 210, which may be regarded as a proxy server. The sender 210, functioning as the proxy server, filters the received encoded data for transmission 230 to the receiver 250. In other embodiments, the sender functions both as the encoder 206 and the sender 210.

A sender 210 herein is also referred to as a server, sender module, or a sender entity. In general, the sender performs the adaptive and selective transmission (AST) process described herein, which includes determining which content elements are not to be transmitted or dropped/filtered. Typically, the sender performs the AST process on encoded source contents, including their encoded source content elements. In general, encoded source content and content elements are herein also referred to as source content and content elements, respectively. A sender, for example, may be embodied as a media server or a proxy server. The encoded source content, including content elements, 220 is typically stored, e.g., in a transmission (TX) buffer 212 prior to transmission to the receiver 250 by the buffer transmitter module 208. The buffer transmitter module 208 in general interfaces with the TX buffer 212 and handles or performs the transmission or streaming of the content elements in the transmission buffer 212 to the receiver 250. In other embodiments, a module within the sender 210 or separate but interfacing with the sender 210 may also be included in the system, not shown, to perform transrating and/or transcoding functions. Typically, the transrating and/or transcoding functions are performed prior to applying the AST process.

The feedback and rate module 218 typically receives and processes the feedbacks 260 from receivers 250 and also determines transmission rates based on the received feedbacks 260. The determined transmission rate may then be applied by the selective dropping module (SDM) module 214 in determining or identifying the content elements within the transmission buffer that are to be dropped/filtered, i.e., not sent to the receiver.

In some embodiments, the SDM 214 modifies the content of TX buffer 212, for example, by deleting content elements in the TX buffer or by setting the appropriate flags associated with the content elements. In other embodiments, the SDM creates a drop set identifying the content elements to be dropped, which may then be used by the buffer transmitter module 208 to identify which content elements in the TX buffer 212 are to be dropped and not transmitted. Thus, the encoded data or content elements 220 received by the sender 210 from the encoder 206 are filtered by the sender 210, i.e., some content elements are intentionally not transmitted by the sender 210 to the receiver 250.

The filtered encoded data or content elements 230 are then delivered or transmitted 240, for example, via one or more network segments 240, wired or wireless, using a transport protocol, which may include user datagram protocol (UDP), transmission control protocol (TCP), real-time transport protocol (RTP), RTP control protocol (RTCP), and the like. The filtered set of content elements 230 is then received by the receiver 250, which typically includes a decoder module 254, which then decodes the filtered encoded data for presentation 268 to a user/consumer 270. The decoder 254, to appropriately decode the received filtered content elements 230, typically supports the decompression and codec scheme performed by the encoder, i.e., adapted to support a common interpretation scheme such that the decoder is able to reconstruct the bit stream(s) into a format that may be used for presentation. A receiver is herein also referred to as a receiving entity or a client. The receiver, for example, may be embodied as a media player.

The receiver 250 also transmits feedbacks to the sender 210. These feedbacks 260 may be transmitted via the same network via which the filtered encoded data 230 have been sent. In some embodiments, these feedbacks 260 may be embodied as RTCP receiver reports (RR), for example, as described in the Request for Comments (RFC) 3550 of the Network Working Group. The RFC 3550 document is herein referred to as RFC3550. RFC3550 also describes RTP. RFC3550 is available, as of this time of writing, from http://www.ietf.org/rfc/rfc3550.txt. The frequency and timing of when feedbacks are transmitted to the sender 210 may be based on conditions described in RFC3550. Other variations on timing and frequency of feedbacks may also be implemented within the system.

The embodiments of the present invention may also apply to situations wherein a sender transmits streaming source content to more than one receiver (not shown), for example, in a multi-cast environment. By having feedbacks 260, the sender is adapted to dynamically adjust to the various receivers' bandwidth. Thus, in some embodiments if the sender is transmitting to two receivers, the sender 210 may adjust to two varying receiver network conditions. Thus, a different set of filtered source content 230 may be sent to the first receiver and another different set of filtered source content 230 may be sent to the second receiver (not shown). A sender may perform adaptive and selective transmission per receiver. Moreover, a sender may perform adaptive and selective transmission based on a condition, such as the average network condition of all receivers or the worst restrictive network condition among participants of a session. The adaptive and selective transmission may also be performed for only a subset of receivers within a session, applied randomly on random receivers, and in other varying means. One of ordinary skill in the art will appreciate that the adaptive transmission feature of the present invention may be applied in various manners.

RTP Packets and RTCP Receiver Reports:

In some embodiments of the invention, RTP and RTCP are employed to transmit the filtered encoded source content 230, as well as to provide feedbacks 260. Although the embodiments of the invention are exemplified using RTP and RTCP, other protocols may also be employed. The use of RTP and RTCP, including RTP header formats and structures, is for illustrative purpose and is not intended to limit the scope of the invention. Furthermore, although the embodiments of the invention are described in terms of frames, other content element structures, e.g., fields, may also be employed.

The filtered encoded source content elements of the present invention may be transmitted as RTP packets. RTP generally relates to a real-time transport protocol that typically provides end-to-end delivery service for data typically with real-time properties. In some applications, RTP may be used with UDP or other suitable underlying network or transport protocols. RTP may also support data transfer to multiple destinations or receivers, e.g., multicast distribution. Content elements, particularly encoded content elements, embodied in RTP are usually transmitted or delivered as RTP packets. An RTP packet typically includes an RTP header and payload data. An RTP payload typically refers to the data transported by RTP in the packet, e.g., source content elements, such as audio samples or compressed video data. The payload data may be a portion of a frame or an entire frame. RTP packets are generally delivered in sequence—identified by a sequence number, thereby enabling a receiver to reconstruct the sender's packet sequence, if appropriate. Table I below shows portions of an exemplary RTP packet, which may contain the source content elements payload.

TABLE I

Exemplary RTP Packet Structure/Format

| FIELD: | DESCRIPTION: |
|---|---|
| Sender or Source Identifier (referred in RFC3550 as SSRC) | Source or Transmitter of a stream of RTP packets, also called Synchronization Source (SSRC) |
| Sequence Number | The sequence number is typically incremented by one for each RTP data packet sent. This sequence number enables a receiver to detect packet loss and to restore packet sequence. |
| Timestamp | Sampling Instant. Timestamps may be used to place received video or content element packets in the correct timing order. Typically, the timestamp is incremented monotonically and linearly in time to enable synchronization and jitter calculation. In some embodiments, several consecutive RTP packets may have the same timestamp value, if they are logically generated at once, for example, the data packets belong to the same video frame. The sequence numbers of the packets transmitted, however, are still monotonic. |

RTCP generally relates to RTP and is typically used to monitor the quality of service and to convey information about the participants in an on-going RTP or RTCP session. RTCP is typically based on the periodic transmission of control packets to all participants in the session. In some embodiments, RTCP receiver reports (RRs) are employed to transmit feedbacks from the receiver(s) 250 to the sender 210. This feedback report may include or indicate the current network condition, including, for example, an indication of the amount of data that may be transmitted to the receiver or receiver capacity. The feedback reports 260 may be sent on a periodic basis or based on other conditions, e.g., such as those defined or supported within RTCP (see RFC3550) or based on bandwidth constraints. In some embodiments, a minimum interval between two feedback reports is provided or supported within the system, for example, as described in RFC3550. Table II below shows portions of an exemplary RTCP packet of an RR.

TABLE II

Exemplary RTCP Packet Structure/Format of a Receiver Report

| Field Name: | Description: |
|---|---|
| Sender/Source (e.g., Synchronization Source (SSRC) of sender) | Source or Transmitter identifier (typically the receiver 250) for the originator of this RR packet. |
| Timestamp | Time when the RR was sent |
| Fraction Lost | The fraction of RTP data packets from source SSRC (e.g., the sender 210) lost since the previous RR packet was sent. In some embodiments, this fraction may be defined to be the number of packets lost divided by the number of packets expected. An exemplary implementation is disclosed in Appendix A.3 of RFC3550. In some embodiments, if the loss is negative due to duplicates, the fraction lost is set to zero. In some embodiments, a receiver is unable to determine whether any packets are lost after the last one is received, and there may be no reception report block issued for a source if all packets from that source sent during the last reporting interval have been lost. |
| Cumulative Number of Packets Lost | The total number of RTP data packets from the source or transmitter (SSRC) (e.g., the sender) that have been lost since the beginning of reception. This number is typically defined to be the number of packets expected less the number of packets actually received, where the number of packets received may include late or duplicate packets. In some embodiments, packets that arrive late are not counted as lost, and the loss value may be negative if there are duplicates. The number of packets expected is typically defined as the extended last sequence number received, less the initial sequence number received. An exemplary calculation is shown in Appendix A.3 of the RFC3550. |
| Extended Highest Sequence Number Received | The extended highest sequence number received in an RTP data packet from source SSRC. |

The fields "Fraction Lost," "Cumulative Number of Packets Lost," and "Extended Highest Sequence Number Received" are transmitted by the receiver typically within the RR or a report block for a sender typically identified by its SSRC. In some embodiments, SRRC in a report block corresponds to and helps identify the sender whose information and/or statistical data are reported in the report block. Other information may be included in the exemplary RR packets, e.g. packet count number, inter-arrival jitter, and user-defined fields. Variations of fields included in the feedback 260 are expected and still be in the scope of the invention.

As discussed, the sender 210 may modify the source content to be transmitted based on feedbacks, e.g., RRs, received from the receiver(s) 250. For example, in some embodiments, cumulative counts may be used in RRs so that differences may be calculated between any two RRs to determine measurements over both short and long time periods, thereby providing additional resilience against the loss or non-receipt of an RR. The difference between the last two RRs received, for example, may be used to estimate the recent quality of the distribution. The timestamp, e.g., the network time protocol (NTP), may be included so that rates may be calculated from these differences over the interval between two RRs. An exemplary calculation that may be performed is the packet loss rate over the interval between two RRs. The difference in the cumulative number of packets lost may provide the number of packets lost during that interval. The difference in the last sequence numbers received may provide the number of packets expected during the interval. The ratio of the difference in the cumulative number of packets lost and the difference in the last sequence number received may be used to define the packet loss fraction over the interval. This ratio typically equals the fraction lost field (e.g., see Table II) transmitted in the RR, if the two RRs are consecutive, but otherwise it may not. The loss rate per second may also be determined by dividing the loss fraction by the difference in timestamps expressed in seconds. The number of packets received may be counted. The number of packets expected may also be used to determine or weigh the statistical validity of any loss estimates. For example, 1 out of 5 packets lost has a lower significance than 200 out of 1000. In addition to the cumulative counts, which enable long-term packet loss measurements using differences between RRs, the fraction lost field may also provide a short-term measurement from a single report. This may become more important as the size of a session scales up enough that reception state information might not be kept for all receivers or the interval between reports becomes long enough that only one report might have been received from a particular receiver.

Figure 3:
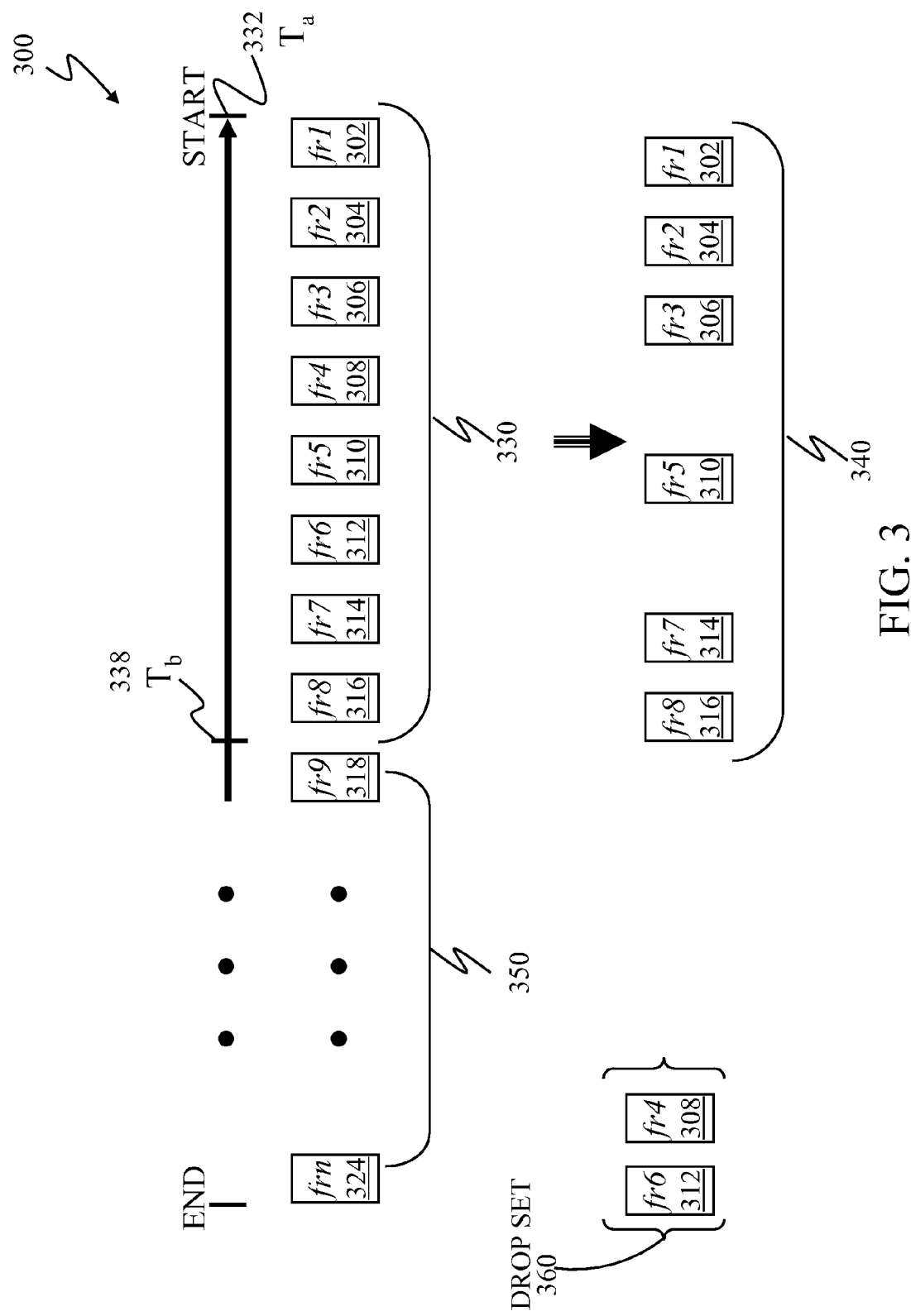
FIG. 3 is a block diagram of exemplary content elements of an exemplary source content, according to an embodiment of the invention.

FIG. 3 is a high-level diagram 300 depicting an exemplary encoded source content, for example, an encoded video consisting of a number of content elements, e.g., frames 302, 304, 306, 308, 310, 312, 314, 316, 318, 324. A source content typically consists of a set of content elements. These content elements, typically depending on implementation, may be frames, packets, groups of pictures (GOPs), slices, pictures, groups of slices, fields, layers, macroblocks, and other data units. The content elements may be subdivided into further content elements, e.g., a frame may be further defined by fields or macroblocks. The original source content is thus typically encoded to appropriately generate properly encoded content elements. The encoding algorithm and the decoding algorithm used by an encoder and decoder, respectively, may depend on the standard being supported.

In this example, the source content is divided into frames 302-324. The AST process described herein selectively drops/filters content elements at the frame level. In other embodiments, the AST process may operate or process at sub-frame or packet level. Other content element data units, however, may also be applied. In some embodiments, a frame may be packetized in a sequence of packets. Thus, an encoded frame may be packetized and transmitted as multiple RTP packets. In other embodiments, one frame is transmitted as one RTP packet. Other variations in the manner of packetizing the encoded content element are expected and within the scope of the present invention.

The sender typically performs the adaptive and selective transmission (AST) process on an encoded source content or portions thereof. The entire video sequence or source content may have been previously encoded 206 and pre-stored or may be encoded 206 live or in real time. The exemplary frames 302-324 are shown in transmission order, where the first frame 302, fr1, is the first encoded frame to be transmitted, fr2 304 is the next frame to be transmitted, and frn 324 is the last encoded frame to be transmitted. For illustrative purposes, let us assume that fr1 302 through fr8 316 are in the TX buffer 212. Other frames, e.g., fr9 318 to frn 324 are still being encoded. In this embodiment, the AST process is applied to fr1 302-fr8 316. Thus, in some embodiments, the AST process is performed only on content elements in the TX buffer, or portions thereof.

The contents of a TX buffer 212 may change, for example, because of incoming new streaming content elements that are to be transmitted. In some embodiments, the TX buffer 212 may be regarded as a series of windows 330, 350. The AST process, for example, may be applied in a time-window-based approach in which all content elements or packets with timestamps within a certain period of time are placed in a window and processed by applying AST before transmission to the receiver. The window approach, however, applies to the frames already in the TX buffer. An exemplary window 330 is shown, bounded by timestamp values $T_a$ 332 and $T_b$ 338, which includes several frames fr1-fr8 302-316. Another window 350, for example may be defined for another set of frames, assuming that such set of frames are in the TX buffer 212. In other embodiments, the content elements of the transmission buffer that are processed by the AST process are based on when the next transmission opportunity may occur. This transmission opportunity may be controlled by an application layer, e.g., by the buffer transmitter module 208. For example, the AST process is applied to only the content elements in the TX buffer, which were originally scheduled to be transmitted in the next transmission opportunity if the AST process were not applied. In other embodiments, content elements are assigned to windows based on their delivery deadlines. In other embodiments, the AST process, particularly the selective dropping process, is applied to all the contents within the TX buffer.

For another illustrative purpose, let us assume that the TX buffer contains fr1 302 to fr8 316. The sender thus may apply the AST process over these frames 302-316. When the selective dropping 214 process is applied, a drop set 360 is typically determined and maintained at the sender. In this example, the drop set 360 includes fr6 312 and fr4 308. The drop set 360 maintains the content elements that are to be dropped and not transmitted by the sender. In some embodiments, the sender 210 of the present invention may intentionally delete content elements in the transmission buffer, identify content elements for deletion, or based on a look-up of the drop set determine whether or not to transmit content elements in the transmission buffer. In some embodiments, content elements not transmitted in the transmission buffer are eventually eliminated from the transmission buffer. In some embodiments the dropping is only applied to the next unit scheduled for transmission from the transmission buffer.

Applying the exemplary selective dropping process using the exemplary drop set 360, the sender typically transmits a filtered set of source contents, e.g., only fr1 302, fr2 304, fr3 306, fr5 310, fr7 314, and fr8 316—without fr4 308 and fr6 312. In some embodiments, a receiver may perform some processing to the received filtered set of content elements, e.g., processes adapted to handle dropped packets or perform error correction. In other embodiments, receiver-side processing is not performed.

In some embodiments, the AST process drops entire frames. In other embodiments, the sender may decide to drop only a few packets from a frame instead of the entire frame. In yet another embodiment, the sender 210 may, instead of dropping a frame, replace an original frame with an alternate frame, such as a smaller size frame or a frame with lesser bits, with data representing a similar frame as the previous or next frame. In other embodiments, the sender 210 may also decide the timing of when to transmit an encoded frame and the amount of data or content element to send at each transmission opportunity.

Figure 4:
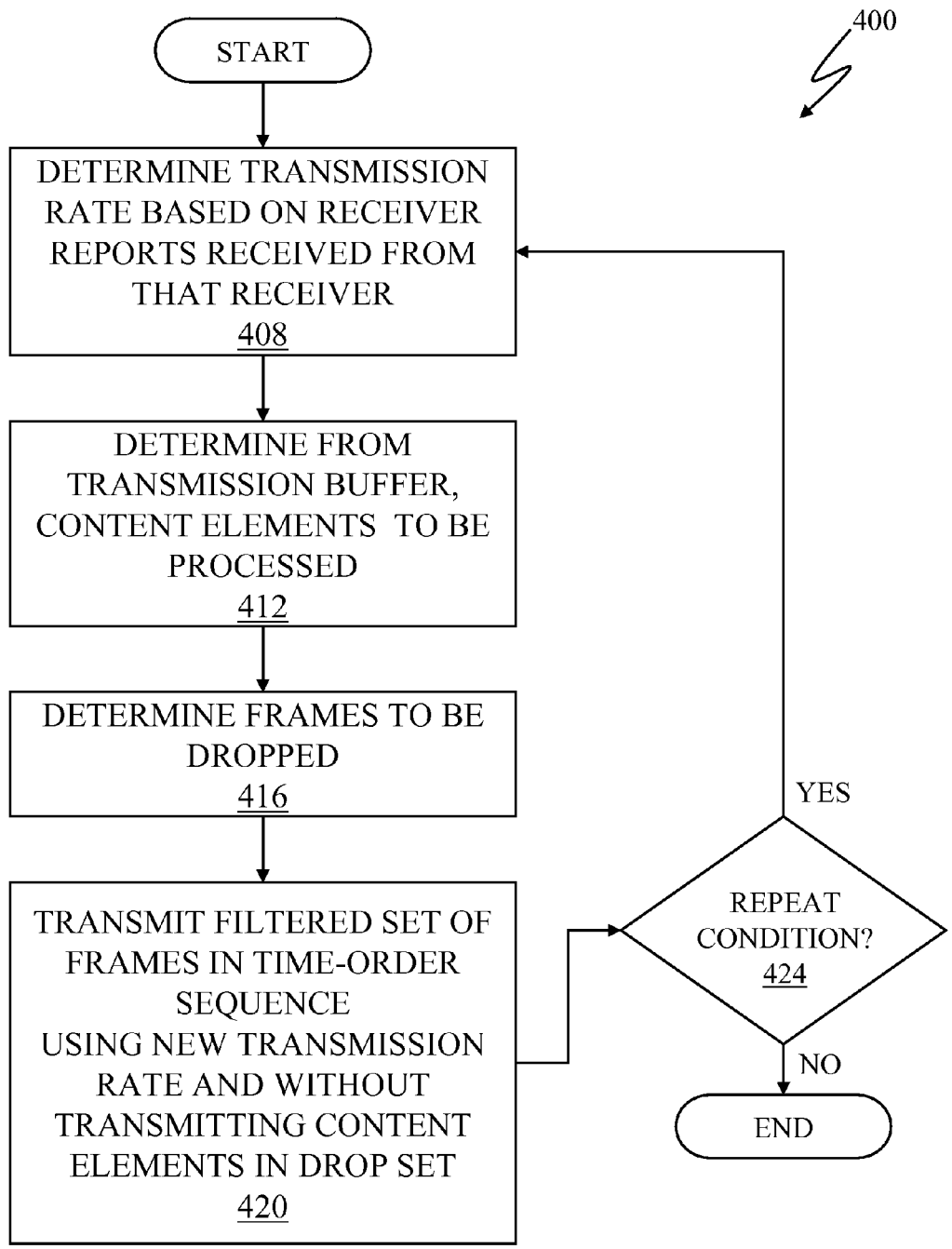
FIG. 4 is a high-level flowchart showing an exemplary adaptive and selective transmission process, according to an embodiment of the invention.

FIG. 4 is a high-level flowchart of an exemplary adaptive and selective transmission (AST) process 400 according to some embodiments of the invention. In general, the sender 210 first determines the transmission rate based on feedbacks, e.g., RRs, received (step 408). Other factors, however, may also be considered such as current backlog of data in the transmission buffer, amount of outstanding/unacknowledged data/packets on the network, past RRs, etc. The sender typically then applies the received feedback information to estimate the amount of data that may be transmitted for the probable current network condition. This determination process is further exemplified in FIG. 6 and may be performed by the feedback and rate module 218. The sender also typically determines the content elements in the transmission buffer to apply the AST process (step 412). In the next operation, the sender determines the frames, packets, or content elements to be dropped or filtered (step 416). This operation (step 416) may be performed by the SDM 214 and is further exemplified and described in FIGS. 7-9B, including the accompanying text. The sender then transmits the filtered set of frames in stream order or transmission order, typically using the determined transmission rate (step 420). The filtered set of content elements is based on the determined drop set. In some embodiments, the transmission order is based on the timestamps encoded within or associated with the content elements. In this embodiment, no out-of-order packets are sent. In other embodiments, packets may be sent out-of-order in order of their importance/priority. The AST process 400 of the present invention typically does not require information from the Media Access Control (MAC) layer.

This adaptive transmission process 400 is typically repeated, for example, based on a cycle, periodically, or based on other conditions as defined within the system (step 424). The AST process, for example, may be repeated until the entire source content is fully transmitted, decoded, and presented to a user, thereby enabling the sender to dynamically adjust to the network conditions of the receivers. In some embodiments, the AST process is repeated based on the cycle of when RTCP RRs are received by the sender. Other conditions of when the AST process is performed or the number of iterations may also be defined, for example, periodically, repeated a defined number of times, based on transmission opportunities, and/or repeated based on a defined condition.

Figure 5:
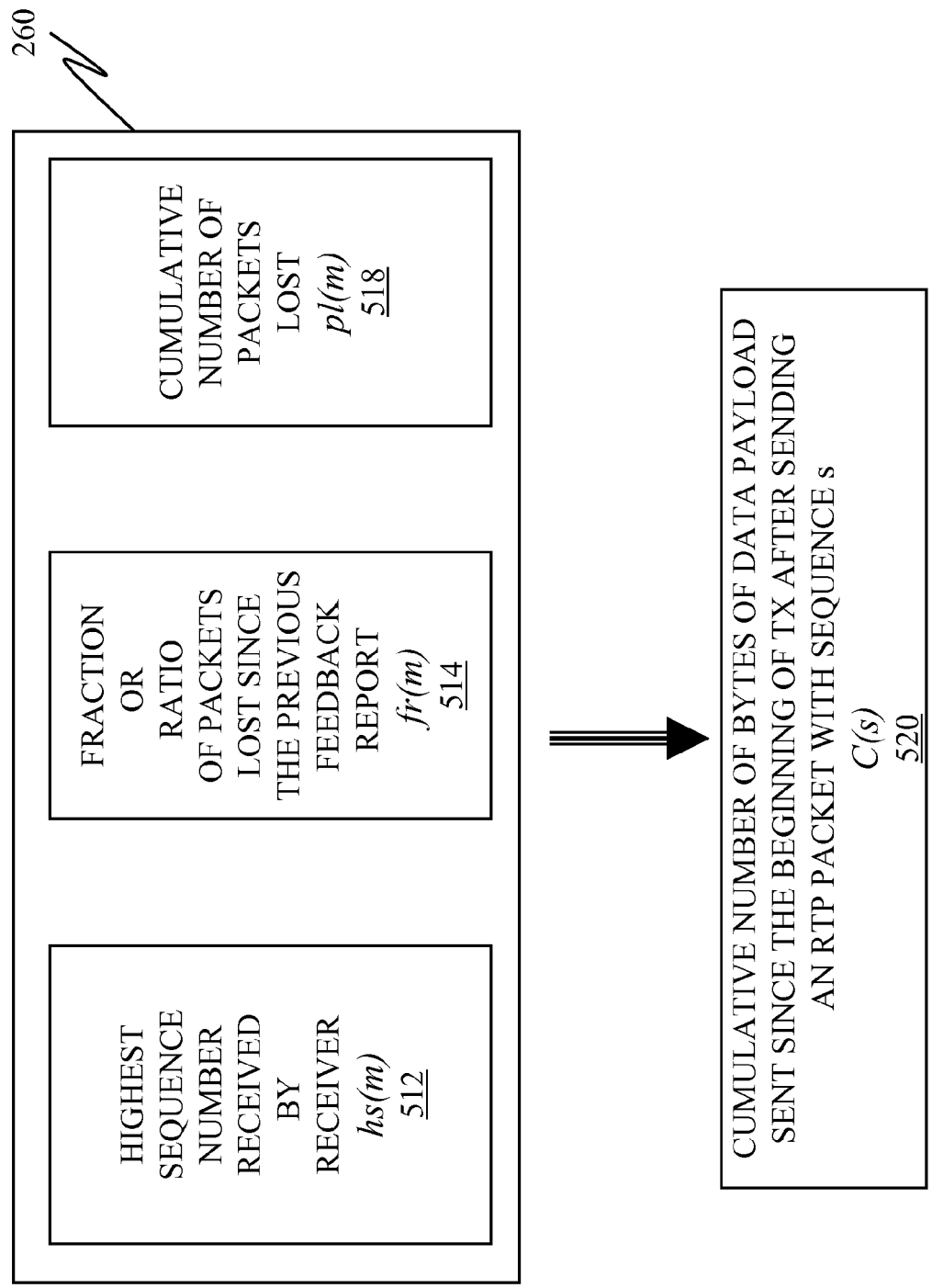
FIG. 5 is a high-level block diagram illustrating exemplary information that may be contained in an exemplary feedback report and may be maintained by a sender, according to an embodiment of the invention.

FIG. 5 is a high-level block diagram of data that may be contained in an exemplary RR 260. Let RR(m) denote an exemplary RTCP receiver report m containing or indicating:

a) the extended highest sequence number received by the receiver when report m was sent: hs(m) 512;

a) the fraction or percentage of packets loss as seen by the receiver since the previous report m-1: fr(m) 514; and b) the cumulative number of packets loss as seen by the receiver starting from the first feedback report: pl(m) 518.

The sender 210, on the other hand, keeps track of the cumulative number of bytes of data payload sent 520, C(s), since the beginning of transmission after sending an RTP packet with sequence number s.

Figure 6:
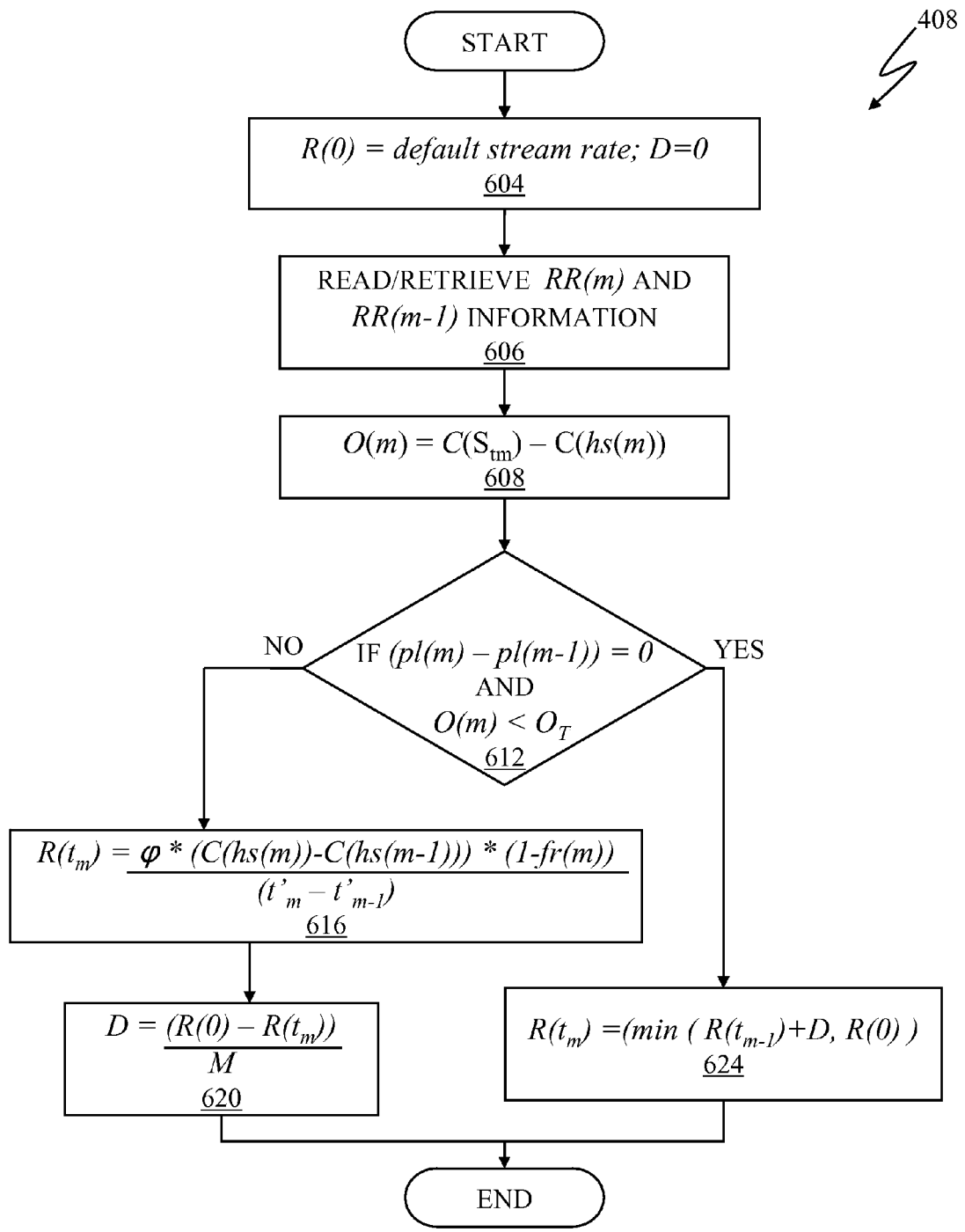
FIG. 6 is a high-level flowchart illustrating an exemplary transmission rate determination process of an exemplary adaptive and selective transmission system, according to an embodiment of the invention.

FIG. 6 illustrates a flowchart of an exemplary rate-determination process 408 that determines the transmission rate for a particular receiver based on that receiver's RRs. Once the transmission rate is determined, this transmission rate is applied by the SDM. In some embodiments, the transmission rate is based on when bits, for example, may leave or be transmitted from the transmission buffer and be received by the decoder or receiver after a constant delay. In general, the transmission rate determines the size of content elements over time, size of content elements/time, the receiver may be able to support.

For illustrative purposes, in addition to those described in FIG. 5:

a) RR(m) indicates the current or most recent RR m;

b) RR(m-1) indicates the report previous to the RR(m) received by the sender for that receiver;

c) $t'_m$ indicates when RR(m) was sent by the receiver d) $t'_{m-1}$ indicates when associated RR(m-1) was sent by receiver e) $t_m$ indicates when RR(m) was received by the sender f) $t_{m-1}$ indicates when RR(m-1) was received by the sender g) $S_{tm}$ indicates the extended highest sequence number of the RTP packet sent by the sender at time $S_{tm}$;

h) $C(S_{tm})$ indicates the cumulative number of bytes of data payload sent by the sender since the beginning of transmission after sending the RTP packet with sequence number $S_{tm}$;

i) R(0) is the default stream rate for that receiver typically determined by being aware or knowing the nominal rate supported by the channel and/or default stream encoding rate; and;

j) M is a constant which is typically a design parameter. In general, a larger M value means a slower reaction to dynamic network conditions, while a smaller M means a faster reaction to dynamic network conditions;

k) $O_T$ indicates a threshold value, which may be defined, for example, based on an estimate or knowledge about the maximum outstanding/unacknowledged bytes that may be held in various buffers (e.g. sender and receiver network stack buffers).

In the initialization operation, an initialization process is performed where variable R(0) is set to the default stream rate and the variable D is set to zero (step 604). The rate-determination process 408 of the exemplary feedback and rate module 218 typically starts by reading or retrieving feedback information, particularly of BR(m) and RR(m-1) (step 606). By using these RRs, the rate-determination process may calculate rates based on current or recent network conditions. In the next operation, the number of outstanding bytes on the network, O(m), is calculated, for example, where O(m)=C $(S_{tm})$–C(hs(m)) (step 608). In general, the O(m) determines the cumulative number of bytes of data payload sent by the sender minus those known to be received by the receiver.

In the next operation (step 612), a check is made as to whether the there has been no change to the cumulative number of packets lost between RR(m) and RR(m-1), e.g., pl(m)– pl(m−1)=0, and if the value of O(m) is less than a threshold value $O_T$. $O_T$, for example, may be defined based on an estimate or knowledge about the maximum outstanding bytes that may be held in various buffers (e.g. sender and receiver network stack buffers). If the condition (step 612) is not met, a new transmission rate is calculated, for example, by an exemplary equation (step 616):

$$R(t_m) = \frac{\varphi*(C(hs(m))-C(hs(m-1)))*(1-fr(m))}{(t'_m - t'_{m-1})}$$

where φ is defined, for example, to be 0<φ≦1. In general, an exemplary manner in determining a transmission rate is based on considering the difference between the number of packets received between the two reports, the fraction of packets lost by the receiver, and the time interval between the two reports, which may indicate or estimate the current or recent capacity of the receiver or the network congestion. Other calculations or manners of determining transmission rates, such as:

a) $R(t_m) = \dfrac{\varphi*(C(hs(m))-C(hs(m-1)))*(1-fr(m))}{(t_m - t_{m-1})}$ or b) $R(t_m) = \dfrac{(C(hs(m))-C(hs(m-1)))}{(t_m - t_{m-1})}$ or c) $R(t_m) = \dfrac{(C(hs(m))-C(hs(m-1)))}{(t'_m - t'_{m-1})}$ may also be performed. In the next operation, a variable D is calculated based on the difference between the default stream rate and the calculated new transmission rate. D, for example, may be calculated (step 620), with an exemplary equation:

$$D = \frac{(R(0) - R(t_m))}{M}$$

If (pl(m)−pl(m−1))≠0 or if O(m)≧$O_T$ (step 612, "yes" branch), the new transmission rate $R(t_m)$ is assigned the minimum of the previous calculated transmission rate plus D, $R(t_{m-1})$+D, and the default stream rate R(0) (step 624). This calculation is made so as to account for possible decreased network congestion or interference, for example.

In some embodiments, where ($t_m - t_{m-1}$) or ($t'_m - t'_{m-1}$), depending of the formula applied, is small, for example, 0.05 seconds, $R(t_m)$ may be calculated as a filtered valued using the previous transmission rate. For example:

$$R(t_m) = \beta * \frac{(C(hs(m))-C(hs(m-1)))*(1-fr(m))}{(t_m - t_{m-1})} + (1-\beta)*R(t_{m-1})$$

Figure 7:
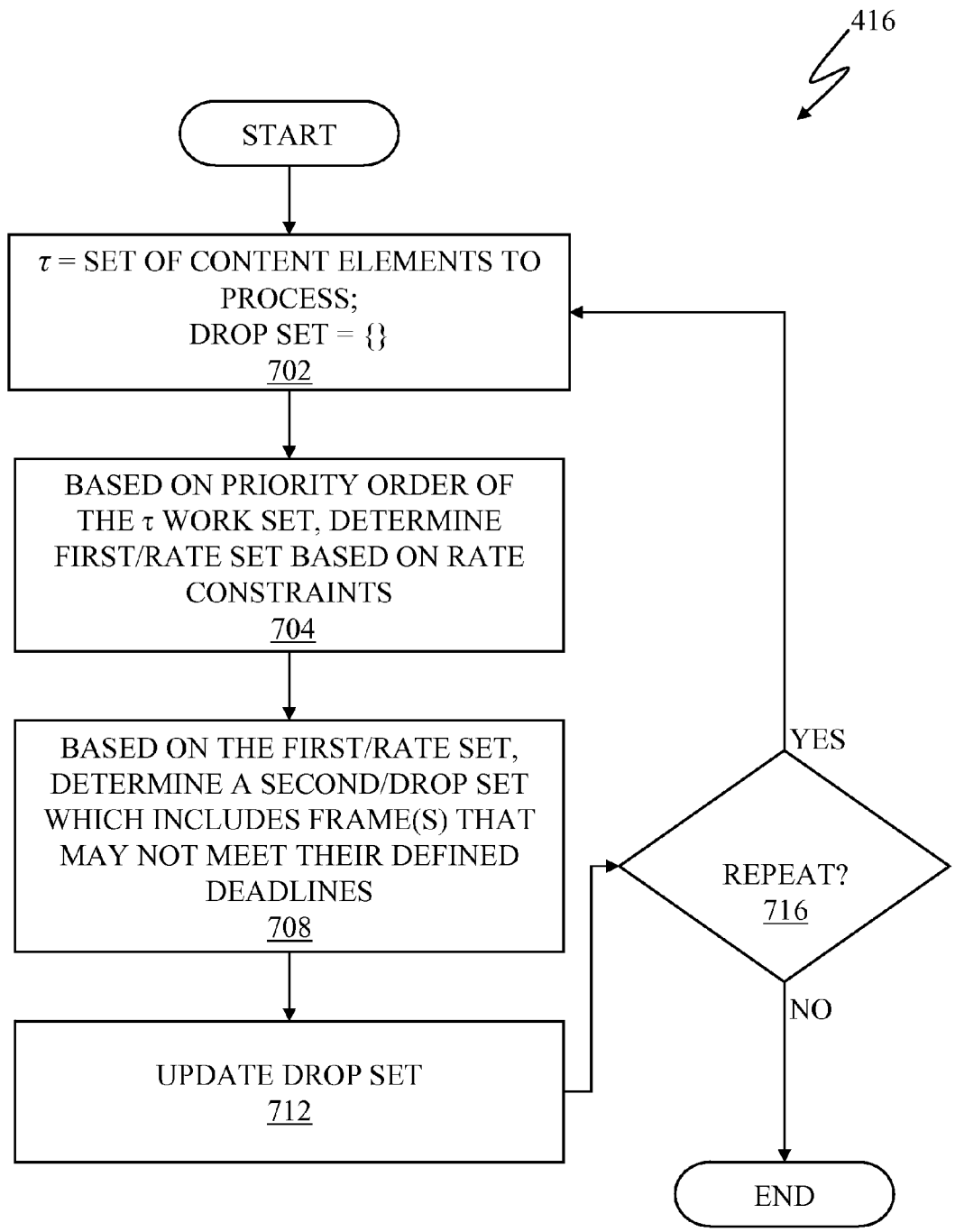
FIG. 7 is a high-level flowchart illustrating an exemplary selective dropping process, which determines content elements to be dropped or filtered, according to an embodiment of the invention.

FIG. 7 is a more detailed flowchart 416 of an exemplary selective-dropping process of the present invention, which may be performed by the SDM 214. FIGS. 8A-8H show exemplary tables representing content elements in exemplary transmission buffers. FIG. 7 and FIGS. 8A-8H are generally discussed together.

Once the AST process has determined the set of content elements in the transmission buffer to apply the selective dropping process to (step 412, FIG. 4), a τ work set, associated with the determined set of content elements, may be created or copied for processing and manipulation (step 702).

The drop set is also typically initialized to the empty set (step 702). For illustrative purposes, let us assume that the τ work set contains several content elements, for example, frames. The exemplary source content is MPEG-2 encoded, with an I-frame distance of fifteen (N=15) and a P-frame distance of three (M=3). MPEG-2 generally specifies a generic coding of moving pictures and associated audio and specifies a video stream format, which may be constructed of three types of frame type—intra frames (I-frames), forward predicted frames (P-frames), and bidirectionally predicted frames (B-frames). These frames may be arranged in a specified order sometimes referred to as a group of pictures (GOP) structure. MPEG-2 encoding is known to those of ordinary skill in the art. Although the discussion herein relates to the MPEG-2 video coding standard, the embodiments of the present invention may also apply to other video coding standards.

An exemplary τ work set may be represented by the exemplary table 820 in FIG. 8A. The τ work set contains seventeen frames 802—fr1 822, fr2 824, fr3 826, fr4 828, fr5 830, fr6 832, fr7 834, fr8 836, fr9 838, fr10 840, fr11 842, fr12 844, fr13 846, fr14 848, fr15 850, ft16 852, and fr17 854. One of ordinary skill in the art will appreciate that these frames may be packetized in various manners, e.g., a frame may be packetized into two or more RTP packets (not shown). In this example, each frame is packetized into one RTP packet and is associated with a corresponding sequence number 812. The transmission order is typically based on the timestamp, decoding timestamp, 804 of the frame. In this example, the order of the sequence number 812 is also associated with the timestamp order 804. In RTP, the content elements are typically transmitted based on sequence number 812.

The timestamp 804 typically indicates a time deadline when the frame has to be decoded by a decoder, typically at the receiver, for presentation. Each frame is also associated or identified with a frame type 810, e.g., "I" for I-frame, "B" for B-frame, and "P" for P-frame. Each frame is also associated with a priority or importance index 806, which may be based on the frame type. The payload size of each content element, in this case frame, is shown, for example, as the number of bits 808. In this example, frame 7, fr7 834, is a "P-frame" with a sequence number of "7," a timestamp of "233," a priority index of "4," and a payload size represented by "B7."

In some embodiments, the priority index 806 of a content element may be based on the video compression technology or encoding scheme employed, in particular, the coding dependencies between content elements. For example, contents elements with lesser importance are those that typically minimize the coding dependency chain and/or encoding error propagation. In other embodiments, the priority index may be based on the amount by which the distortion or peak signal-to-noise ratio (PSNR) at the receiver may be decreased, e.g., by calculation or estimation, if the content element is decoded (on time) at the receiver. The priority index may also be based on the frame type and its position in the group of pictures (GOP).

In this example, the source content is encoded with an IBBPBBPBBPBBPBBB. Considering the first frame, which is an I-frame 822, is the frame that has the most number of frames dependent on it, fr1 822 is assigned a priority or importance value of six ("6"). Similarly, the next I-frame, fr16 852, in the next GOP is also assigned a priority index of "6." The P-frames are then ranked in descending priority value. In this example, a P-frame depends on the closest I— or P-frame preceding such P-frame. Thus, P-frame fr10 840 depends of P-frame fr7 834. Considering such dependency and/or potential decrease in PSNR, the P-frames fr4 828, fr7 834, fr10 840, and fr13 846 are assigned priority values "5," "4," "3," and "2," 806 respectively. All the B-frames 824, 826, 830, 832, 836, 838, 842, 844, 848, 850, 854 are assigned the priority value of one ("1"), considering they have the least dependence and generally may be dropped without impacting other frames.

The exemplary τ work set 820 shows that there are seventeen frames 820 in the transmission buffer—fr1 822 to fr17 854, to be transmitted by the sender, e.g., by the buffer transmitter module 208. The drop set at this point is initialized to an empty set (step 702). In the next operation, a first or rate set based on the rate constraint of the receiver is determined, based on a T work set ordered in priority order (step 704). This first/rate set is typically determined based on the payload size of the content element 808 and generally indicates the set of content elements, which if transmitted may potentially be received by the receiver based on its rate constraint. This operation may involve sorting the content elements in the τ work set 820 in priority order, as represented by the next table 860 (FIG. 8B), and adding each of the payload size 808 of the frame, in priority order, until the accumulated payload size is typically of the maximum size that may be accommodated by the sender-determined transmission rate/receiver rate constraint.

In this example, let us assume that the first/rate set 862 is determined to consist of fr1 822, fr16 852, fr4 828, fr7 834, fr10 840, fr13 846, fr2 824, fr3 826, fr5 830, fr6 832, fr8 836, and fr9 838. This means that the accumulated payloads of B1+B16+B4+ . . . +B6+B8+B9 may be supported by the receiver. Adding the additional payload of fr11 842, B11 808, for transmission, however, is calculated to exceed the receiver's rate constraint. The selective dropping process typically stops adding frames, e.g., their bits sizes 808, when the selective dropping process calculated that fr11 842 may potentially exceed the receiver's rate constraint. Thus, fr11 842 and the rest of the exemplary frames, fr12 844, fr14 848, fr15 850, and fr17 854 are typically not part of this first/rate subset. Based on this first set 862, the selective dropping process then determines a second set or drop set, indicating frames that even if received at the receiver may not be decoded and/or presented at its specified presentation deadline (step 708). For example, after determining the first set 862 (FIG. 8B), each content element in this first set, now shown as exemplary table 864 (FIG. 8C), but ordered in timestamp priority order, is checked to see if the receiver may be able to present such content element within the specified timestamp deadline of that content element (step 708). For illustrative purpose, let us assume that fr6 832, 866 is determined or calculated so that even if transmitted, that frame 832 may not arrive, not be potentially decoded and/or presented at the receiver at the specified deadline, e.g., based on the decoding timestamp 804. The content element fr6 832, 866 is thus added to the drop set (step 712). The selective dropping process 416 performed, e.g., by the SDM 214, may be repeated, e.g., based on defined conditions, as shown (step 716). In other embodiments, the AST process in general is performed and/or repeated before each transmission opportunity, as defined or implemented in the system.

If selective dropping process is not to be repeated ("no" branch of step 716), the sender, e.g., the buffer transmitter module 208, may then transmit the content elements within the transmission buffer, typically excluding those content elements identified in the drop set, e.g., without fr6 832 (step 420, FIG. 4). The filtered set of content elements is typically transmitted in timestamp order or transmission order, which in some embodiments may also be the sequence number, e.g., as represented in the exemplary table 866 (FIG. 8D). Referring back to FIG. 8B table 860, the selective dropping process has calculated that transmitting fr11 842, and potentially fr12 844, fr14 848, fr15 850, and fr17 854 may potentially exceed receiver's rate constraint. These frames, in some embodiments, however, are not added to the drop set. These frames 842, 844, 848, 850, 854 are left as part of the T work set so they may be part of the SDM process in the next cycle. In other embodiments of the invention, however, these frames fr11 842, fr12 844, fr14 848, fr15 850, and fr17 854 are included in the drop set or not transmitted.

There are various ways of implementing the dropping feature of the present invention. In some embodiments, the SDM module or another module may delete the identified drop set content elements, e.g., fr6 832, in the transmission buffer. In other embodiments, a flag associated with the drop set content element is set so as to indicate that the particular frame is not be transmitted to the client. In other embodiments, the buffer transmitter module 208 may prior to transmitting the content element, check the drop set to determine if the frame to be transmitted is included in the drop set. If such frame is indicated in the drop set, the buffer transmitter 208 accordingly drops that frame, i.e., not send, and retrieves the next content element in the transmission buffer for transmission, if appropriate.

The selective dropping process may be repeated based on one or more conditions, e.g., repeated once, repeated a defined number of times, and repeated periodically. In some embodiments, the process is repeated until there is no change to the drop set content elements and/or in the τ work set. Assuming that the selective dropping feature (step 716) is to be repeated, the SDM process continues from the table 864 in FIG. 8C to the table 868 of FIG. 8E. The drop set content element, e.g., fr6 832, is ignored in the calculation or eliminated from the next T work set as represented in the table 868, considering that the process assumes that fr6 832 is not going to be transmitted. The rate set (870), which for this example contains fr1 822, fr16 852, fr4 828, fr7 834, fr10 840, fr13 846, fr2 824, fr3 826, fr5 830, fr8 836, fr9 838, fr11 842, and fr12 844, is then again determined based on the updated τ work set 868 (step 704). Transmitting fr14 848 is determined to exceed the receiver's rate constraint. Transmitting fr15 850 and fr17 854 may also potentially exceed the receiver's rate constraint. Based from this rate set 870, represented also in the set 892 but in timestamp-order, in the table 872 of FIG. 8F, each content element is then checked to determine if the defined deadline may be met. In this example, fr13 846, 890 has been determined, even if transmitted, being unable to meet its deadline. This frame fr13 846 is thus added in the drop set. The process, if repeated, may then determine another rate set 876, e.g., represented in the table 874 of FIG. 8G. In this example, all content elements in the τ work set, without the two drop set content elements fr6 and fr13, may be transmitted and still potentially meet the receiver's rate constraint. Each content element is then checked to determine if the deadline may be met. In this example, all content elements have been calculated to meet their deadlines. The filtered set of content elements that may be transmitted by the sender is represented in the table 880 of FIG. 8H. The filtered set 880 is transmitted in transmission order or timestamp order 804, which in this example, also relates to the sequence number order 812. Considering that there is no more change to the drop set and/or all the τ work set, the selective dropping process may then be terminated for this exemplary transmission buffer. Frames fr6 and fr13 are not transmitted.

In other embodiments, additional dropping strategies may be incorporated as part of the selective dropping procedure. For example, referring to the table 872 in FIG. 8F, fr13 846, 890 is a P-frame, thus B-frames that depend on fr13 846 may also be included in the drop set. In other embodiments, not shown, it is also possible that the content elements in the transmission buffer may have changed, for example, due to new content elements being added in the transmission buffer. In such scenario, the selective dropping process may consider such content element in the next cycle of calculation, drop such content element, or send that content element. In some embodiments, conditions may be defined to handle additional content elements being added to the transmission buffer while the selective dropping process is being performed.

In other embodiments, once a drop set is identified, e.g., fr6 832 in exemplary table 864 (FIG. 8C), the filtered set of content elements or a portion thereof is transmitted, e.g., one or more content elements—within the set of filtered content elements but without content elements identified in the drop set—are transmitted. For example, after identifying that fr6 832 is part of the drop set, only the first content element in the filtered set of content element in timestamp order, see e.g., Table 866 in FIG. 8D, i.e., fr1 822, is transmitted. In this embodiment, the process then repeats itself, for example, by determining another first or rate set, but now without fr1 822, and from such first/rate set determine a next drop set. Once the next drop set is identified, only the first content element in timestamp order in that filtered set of content elements is then again transmitted. The process then continues, for example, until there is no more content element in the transmission buffer. In this exemplary embodiment, the adaptive and selective process described herein is applied, e.g., content element by content element, so as to determine if the next content element adapted to be transmitted, e.g., added, in the transmission buffer is to be transmitted or not, based on the process described herein. Other variations of process repetition and/or the number of content elements to be transmitted in the determined filtered set of content elements may be also be adapted and still be in the scope of the present invention.

Figure 9A:
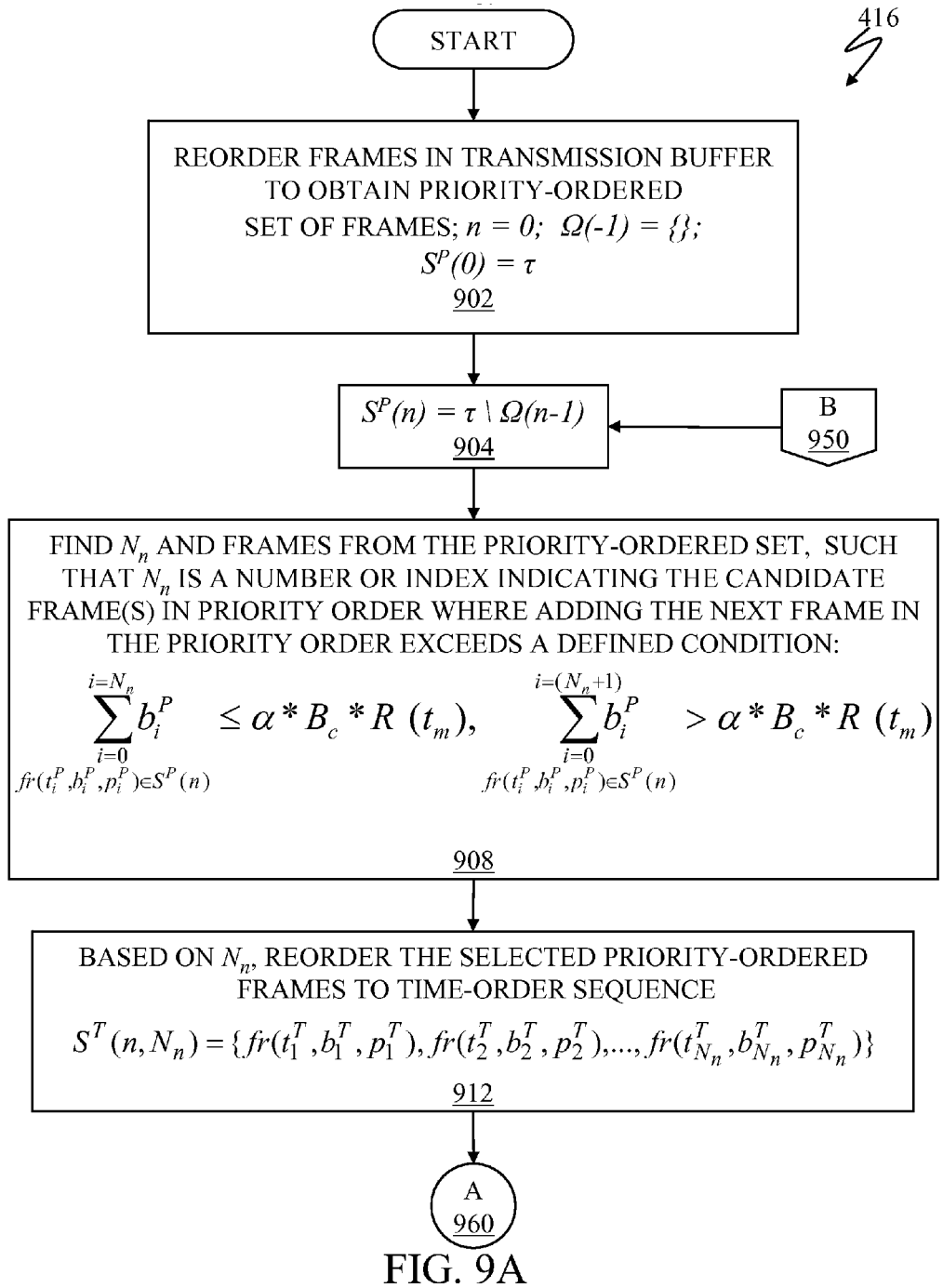
FIGS. 9A and 9B together illustrate another exemplary selective dropping process of an exemplary adaptive and selective transmission system, according to an embodiment of the invention.
Figure 9B:
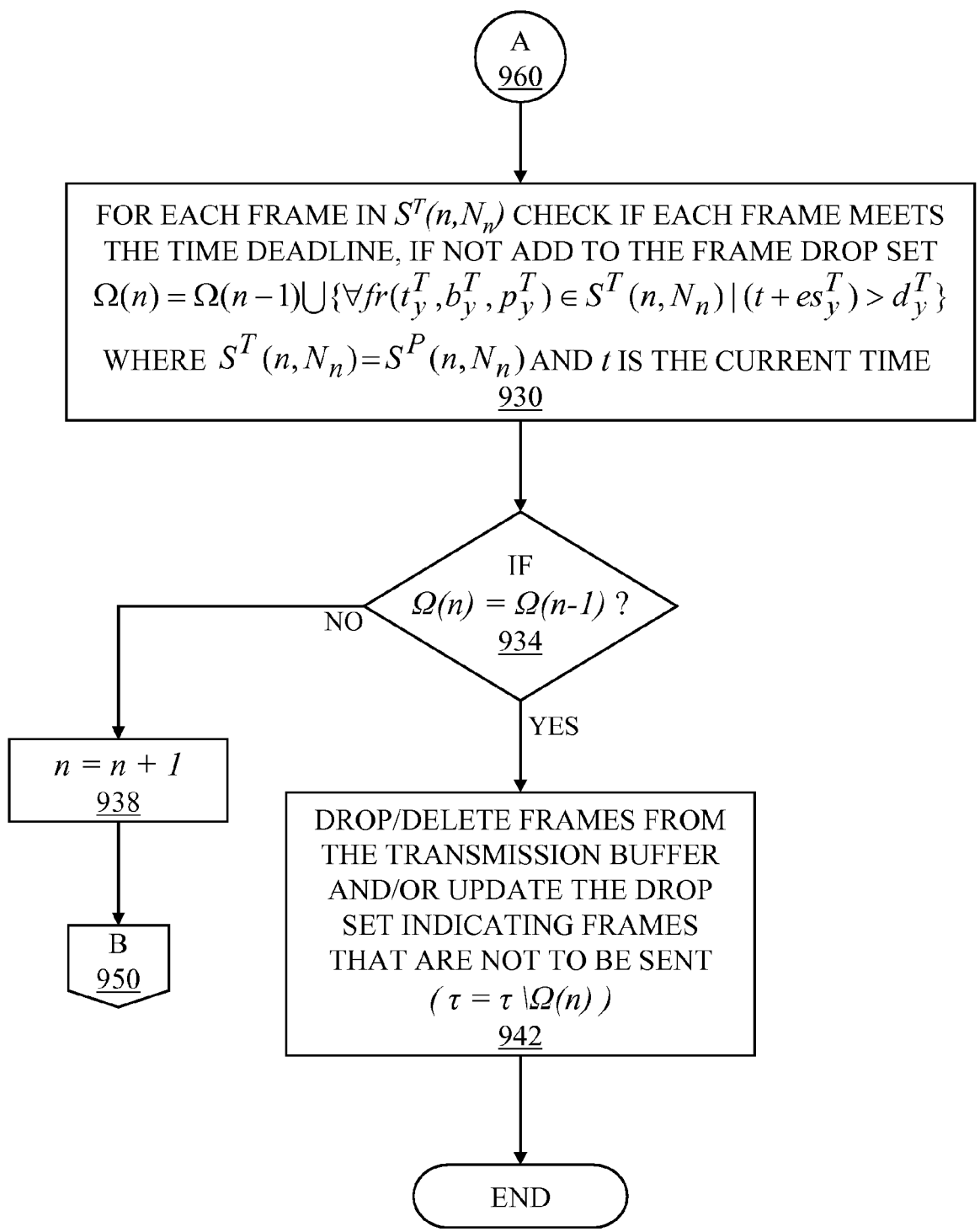

FIG. 9A and 9B illustrate another exemplary embodiment of the selective dropping module process 416 according to another embodiment of the invention. The selective dropping process is typically performed after a rate determination process 408 (see FIG. 4). In this exemplary embodiment, let us represent a frame j in the transmission buffer as $fr(t_j, b_j, p_j)$, with:

a) the time-stamp of the frame: $t_j$;
b) the size the of the frame: $b_j$;
c) the priority or importance index: $p_j$.

At any time, the transmission buffer typically consists of a number of frames or content elements, for example, as represented in the table 820 (FIG. 8A). The embodiments of the invention provide for two order sequences for the set of frames in the transmission buffer. The exemplary orders are:

a) by Priority or Importance Index order:

$$S^P = \{fr(t_1^P, b_1^P, p_1^P), fr(t_2^P, b_2^P, p_2^P), \ldots fr(t_N^P, b_N^P, p_N^P) | p_1^P \geq p_2^P \geq \ldots \geq p_N^P\}$$

where $S^P$ is typically ordered in a monotonic non-increasing order based on priority or importance index; and b) by Timestamp Order:

$$S^T = \{fr(t_1^T, b_1^T, p_1^T), fr(t_2^T, b_2^T, p_2^T), \ldots fr(t_N^T, b_N^T, p_N^T) | t_1^T \leq t_2^T \leq \ldots \leq t_N^T\}$$

where $S^T$ is typically ordered in a monotonic non-decreasing order based on timestamp.

Furthermore, let $d_j^T$: delivery deadline for $fr(t_j, b_j, p_j)$;
$O_c = O(m) - [(t-t_m)*R(t_m)]$, where $R(t_m)$, for example, is one determined in the rate determination process (e.g., See FIG. 6) and t is the current time; and $$es_j^T = \frac{\left(O_c + \sum_{k=0}^{k=j} b_k^T\right)}{R(t_m)}$$

when RR (m) is the last receiver report received.

The AST process in general finds the subset of frames in the transmission buffer in timestamp order—$SS^T(t)$. An exemplary formula:

$$SS^T(t) = \{fr(t_j^T, b_j^T, p_j^T) | \forall j: (t + es_j^T \leq d_j^T, R(SS^T(t)) \leq R(t_m)\} \max\left(\sum_{SS^T(t)} p_j \delta(t_j)\right)$$

may be applied, for example. The set $SS^T(t)$ thus contains the set of frames in the transmission buffer ordered in timestamp order, where such frames have been determined or calculated to arrive before or at the delivery deadline, $(t+es^T_j) \leq d^T_j$, and where $R(SS^T(t)) \leq R(t_m)$. Furthermore, $\delta(t_j)=1$ if all the frames on which $fr(t_j, b_j, p_j)$ depends are included in $SS^T(t)$.

In one exemplary embodiment, the subset $SS^T(t)$ to be transmitted may iteratively be determined. In the first operation (step 902), an initialization process is performed, which may include ordering the content elements in the transmission buffer in priority index order. One of ordinary skill in the art will appreciate that this may be handled, for example, by a set of program instructions that orders or sorts data in an array, e.g., based on priority index, for example. Furthermore, the following variables are initialized: n=0; $\Omega(-1)=\{\}$; and $S^P(0)=\tau$, where the $\tau$ work set is the set of all frames currently in the transmission buffer and $\Omega$ is a drop set indicating or containing the frames to be selectively dropped or not transmitted by the sender. In some embodiments, the $\tau$ work set may contain only a subset of all the frames currently in the transmission buffer or may be defined based on the next transmission opportunity. In the next operation (step 904), a set operation is performed such that $S^P(n)=\tau\backslash\Omega(n-1)$. In the first iteration, the $S^P(n)$ or $S^P(0)$ thus may be the set of all content elements in the transmission buffer.

In the next operation (step 908), an $N_n$ value is determined such that $$\sum_{\substack{i=0 \\ fr(t_i^P, b_i^P, p_i^P) \in S^P(n)}}^{i=N_n} b_i^P \leq \alpha * B_c * R(t_m),$$

$$\sum_{\substack{i=0 \\ fr(t_i^P, b_i^P, p_i^P) \in S^P(n)}}^{i=(N_n+1)} b_i^P > \alpha * B_c * R(t_m)$$

where $\alpha$ may be defined as $0 < \alpha \leq 1$ and $B_c$ is the receiver buffer size in time units or end-to-end delay, e.g., from transmitting from sender to receiving by receiver, and where RR(m) is the last RR received. The receiver buffer size may have been previously exchanged between the sender and the receiver. Referring to FIG. 8B, for example, $N_n$=11 and is pointing to fr9 838, such that the size of each candidate frame in the rate set 862 is added resulting in (B1+B16+B4+B7+ B10+B13+B2+B3+B5+B6+B8+B9)≦α*$B_c$*R($t_m$). Thus, $N_n$+1=12 results in (B1+B16+B4+B7+B10+B13+B2+B3+ B5+B6+B8+B9+B11)>α*$B_c$*R($t_m$).

In the next operation (step 912), after determining the candidate frames (rate set 862), the frames being processed are reordered in transmission order, e.g., based on timestamp order. The exemplary formula:

$$S^T(n,N_n)=\{fr(t_1^T,b_1^T,p_1^T),fr(t_2^T,b_2^T,p_2^T),\ldots,fr(t_{N_n}^T,b_{N_n}^T,p_{N_n}^T)\}$$

may be applied. See, for example, exemplary table 864 in FIG. 8C.

In the next operation (step 930, FIG. 9B), a check is then made to determine whether each candidate frame in the rate set may meet its delivery deadline, where $$\Omega(n)=\Omega(n-1)\cup\{\forall fr(t_y^T,b_y^T,p_y^T)\in S^T(n,N_n)|(t+es_y^T)>d_y^T\}$$

and where $S^T(n,N_n)=S^P(n,N_n)$ and t is the current time frame.

In the next operation (step 934), an exemplary stopping condition is verified, wherein the selective dropping process determines whether there has been a changed between the previous drop set and the current drop set. This condition, for example, may be represented by determining if $\Omega(n)=\Omega(n-1)$. If there has been no change to the drop set, (step 934, "yes" branch), drop frames from the transmission buffer, $\tau=\tau\backslash\Omega(n)$, (step 942). As discussed above, the frames may be actually deleted from the transmission buffer, or marked such that such drop frame is not to be transmitted by the sender or to be process for further AST processing, and the like. The filtered set of frames in the transmission buffer, $\tau=\tau\backslash\Omega(n)$ (step 942), is then transmitted in their transmission or stream order, typically based on timestamp.

If, however, there has been a change in the drop set (step 934, "no" branch), n is incremented by 1, n=n+1, and the process is repeated as shown. In some embodiments, only one or a defined fixed number of iterations is performed and the set τ from the last iteration or cycle may be used for processing. In other embodiments, the set τ contains all the content elements in the transmission buffer, without the content elements identified in the drop set. In other embodiments, only the next immediate frame to be sent is dropped, if such frame or content element belongs to the drop set $\Omega(n)$. Typically, the selective dropping function is performed before each transmission opportunity, e.g., before transmitting each frame, which may be defined, for example, by another application or entity, e.g., by the buffer transmitter module.

Figure 10:
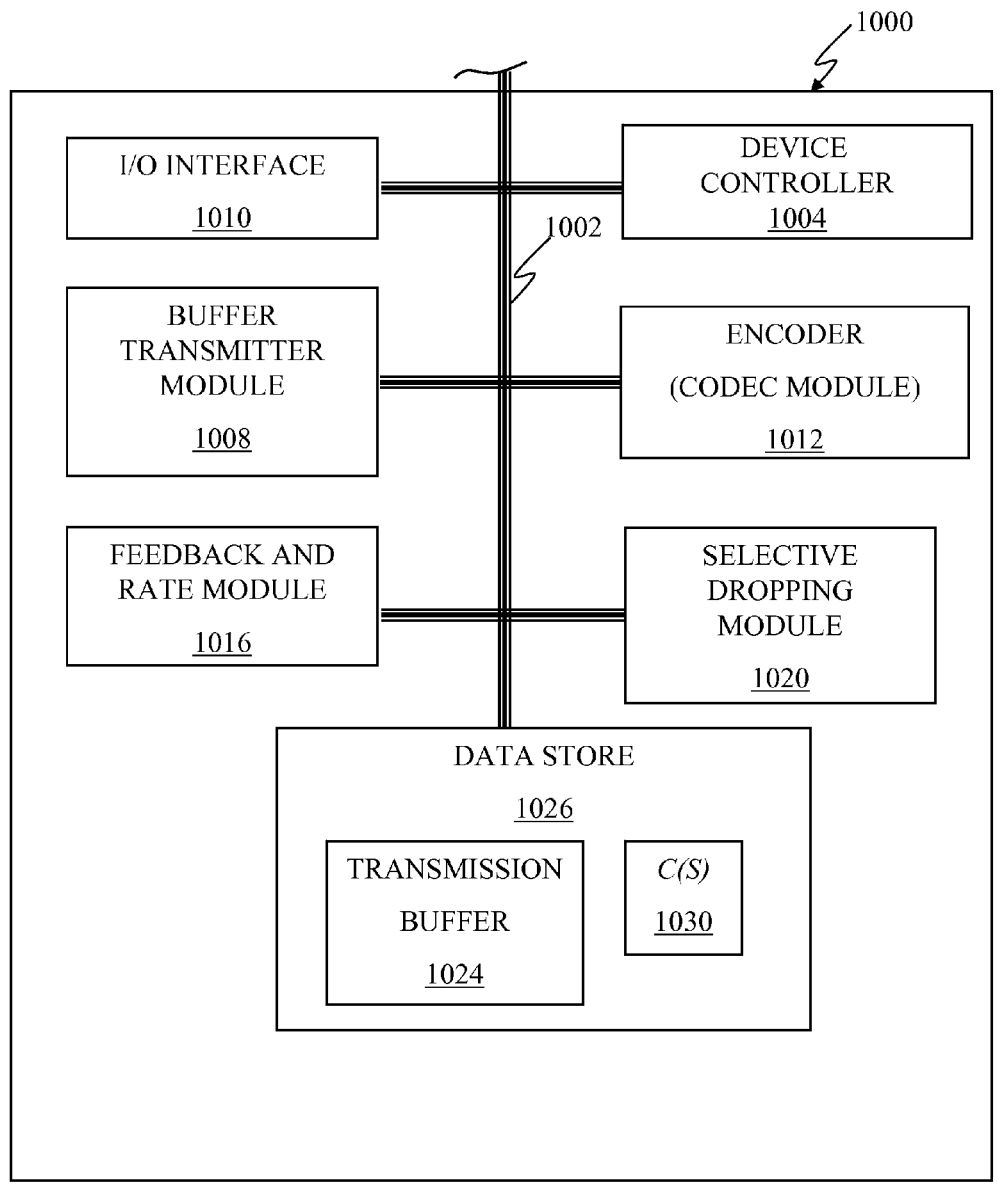
FIG. 10 is a high-level block diagram of an exemplary sender or sending entity, according to an embodiment of the invention.

FIG. 10 is an exemplary sender device 1000 adapted to perform the adaptive and selective transmission process described herein, according to an embodiment of the invention. The exemplary sender 1000 typically includes an input/output I/O interface card 1010 adapted to enable the sender 1000 to communicate with the network. The sender 1000 also includes a data store 1026, which may be volatile or non-volatile memory. Such data store may contain the transmission buffer 1024, which typically temporarily stores content elements ready for transmission to the receiver. The data store may also contain cumulative counts 1030 and other information maintained by the sender, e.g., drop set information. The buffer transmitter module 1008 of the sender 1000 is adapted to transmit the content elements in the transmission buffer, but typically excluding content elements identified by the selective dropping module 1020. The feedback and rate module 1016 of the sender 1000 receives and processes the feedback reports received from the receivers, as well as perform the rate determination process described herein. The selective dropping module 1020, typically using the transmission rate determined by the feedback and rate module 1016, determines which content elements in the transmission buffer are not to be transmitted by the buffer transmitter module 1008. The device controller 1004 of the sender 1000 is typically adapted to control the overall functions of the sender device 1000. In some embodiments, the sender may also include an encoder or codec module 1012 adapted to encode source content, particularly, if the sender also performs the encoding process. In some embodiments of the invention, the different modules in FIG. 10 may communicate and interface with each other via a bus, dedicated signal paths or one or more channels 1002. Depending on the function of the device, other modules, including functions and capabilities, may be added or removed. Furthermore, the modules described herein may be further subdivided and combined with other functions so long as the function and processes described herein may be performed. The various modules may also be implemented in hardware, software, or both, i.e., firmware.

Figure 11:
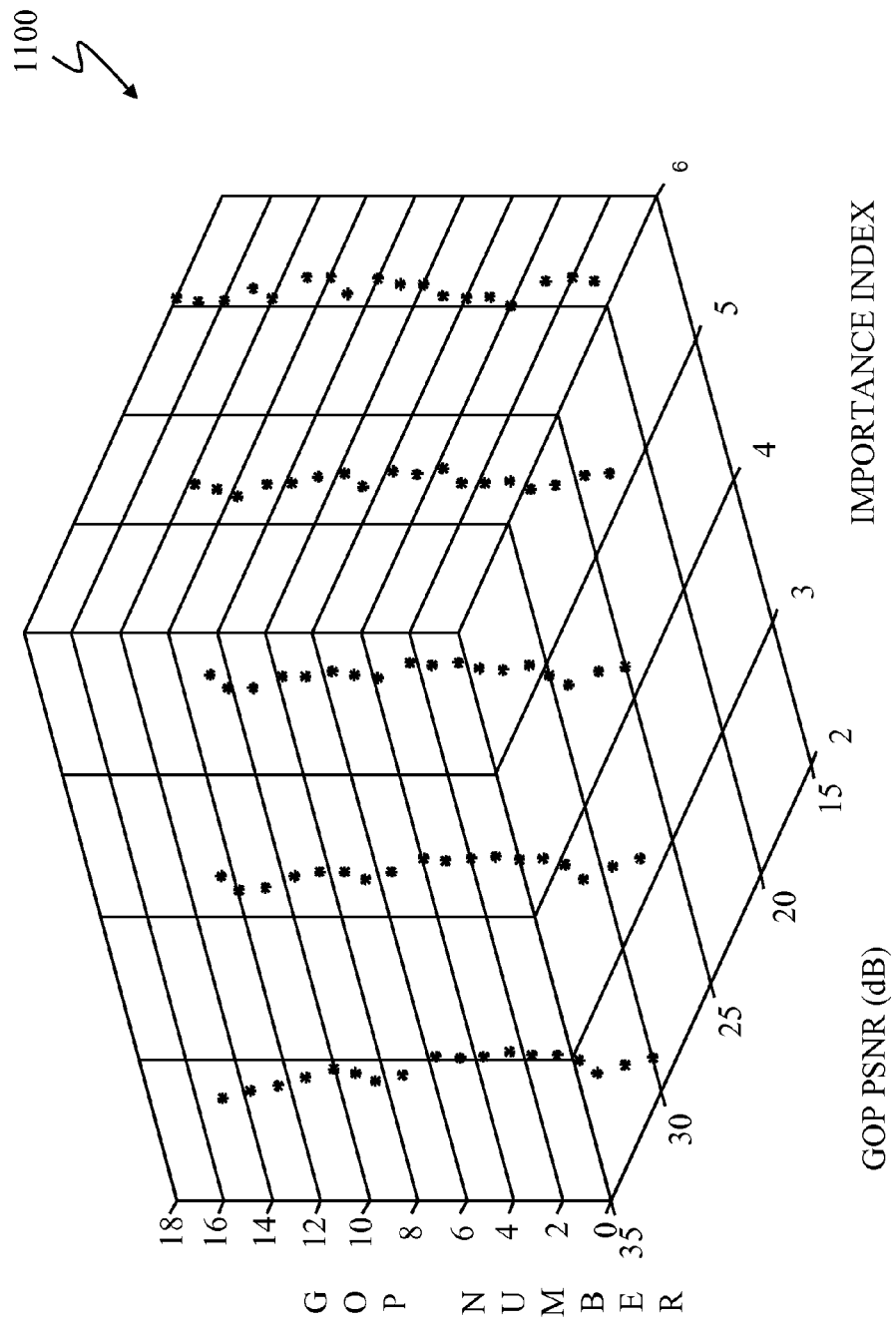
FIG. 11 is an exemplary graph showing frame priority index versus frame loss group of picture (GOP) peak signal-to-noise ratio (PSNR), according to an embodiment of the invention.
Figure 12:
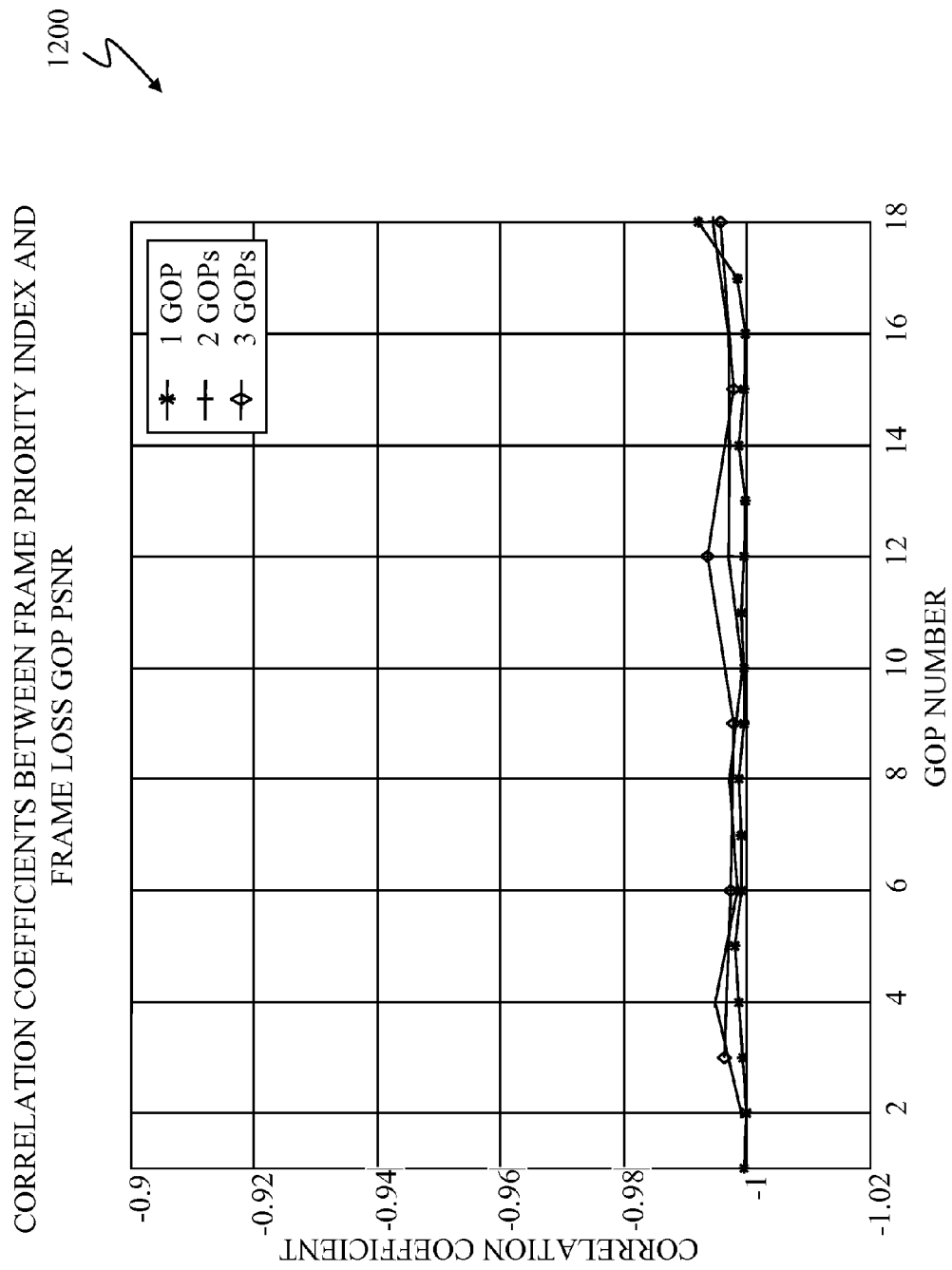
FIG. 12 is an exemplary correlation coefficients graph, according to an embodiment of the invention.

Experimental Results:

Frame Priority or Importance Index:

FIGS. 11 and 12 illustrate exemplary results of an experiment. The experiment involves a GOP encoded in MPEG-2 format, with N=15 and M=3. The GOP format is IBBPBBPBBPBBPBB with each frame respectively assigned priority index 6, 1, 1, 5, 1, 1, 4, 1, 1, 3, 1, 1, 2, 1, and 1. FIG. 11 shows a scatter plot 1100 showing the frame priority index versus frame loss GOP PSNR for an exemplary video sequence or source content, with varying number of GOPs. The source content contains moving picture sequences or mobile sequence. FIG. 12 shows an exemplary graph 1200 of correlation coefficients between frame priority index and frame loss GOP PSNR for intra GOPs and inter GOPs for an exemplary video sequence. Typically, intra GOP means within one GOP, while inter GOP means between two or three GOPs, as shown, for example, by the curve.

FIGS. 11 and 12 thus show that the priority index exemplified above may work well considering that the priority index is correlated, may even be construed as highly correlated, to the decrease in PSNR achieved by transmitting the particular frame. In other embodiments, the distortion caused by not sending a frame may be computed and considered in determining such frame's priority index.

Adaptive and Selective Transmission (AST) Process:

In another experiment, a client/receiver executes the following steps:

a) The client/receiver receives the media packets/content elements sent by the server/sender. The media packets are typically sent from the server in the stream order, e.g., sequence number order, thus the only possible out-of-order delivery may happen due to the network elements. The client looks to the sequence number of each RTP packet to determine if any reordering is required. If the packet is received before its deadline, the client decodes and presents the packets.

b) The client periodically sends feedback reports, e.g., RTCP RRs, to the server.

The AST feature described herein was implemented using Network Simulator (NS2), with some modifications. The NS2 network simulator may be obtained from http://www-w.isi.edu/nsnam/ns/. A number of simulations were performed to evaluate the performance of the adaptive and selective transmission process described herein. The performance of the AST process with that of a transrater and also with the combination of transrater and AST (Transrater+APT) were compared.

Figure 13:
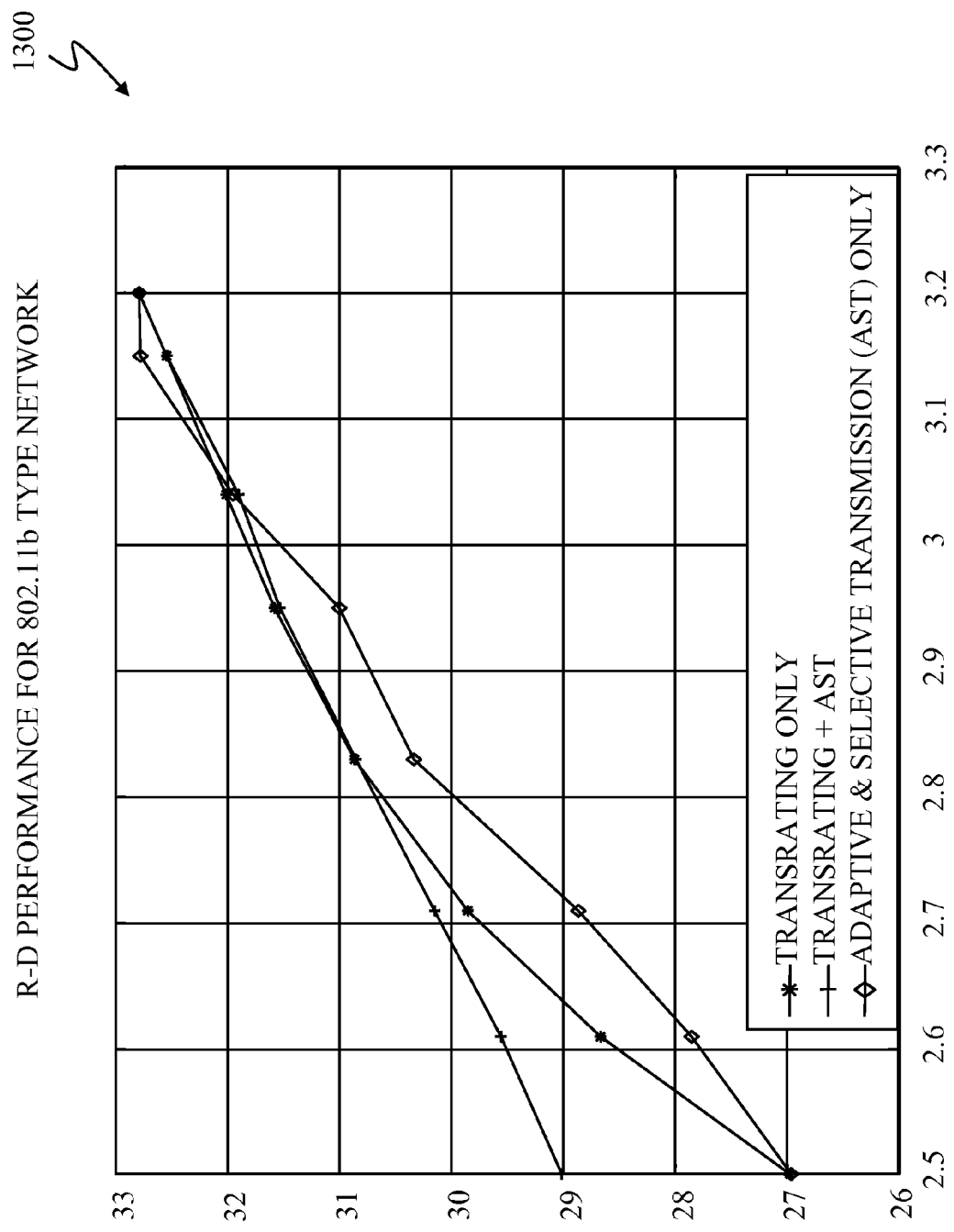
FIGS. 13 and 14 are exemplary graphs showing rate-distortion results, according to embodiments of the invention.

FIG. 13 shows the rate-distortion (R-D) performance comparison 1300 for the following scenarios:
a) Applying AST only,
b) Applying Transrating only and
c) Applying Transrating+AST.

This experiment was performed over an 802.11b-type network for video sequence. The exemplary source content/video sequence is "mobile" with common intermediate format (CIF) resolution, and 30 frames per second (fps) original sequence. Each rate point on the plot corresponds to a network bandwidth variation scenario. The results in FIG. 13 were averaged over different receiver/client buffer sizes and feedback frequency.

Figure 14:
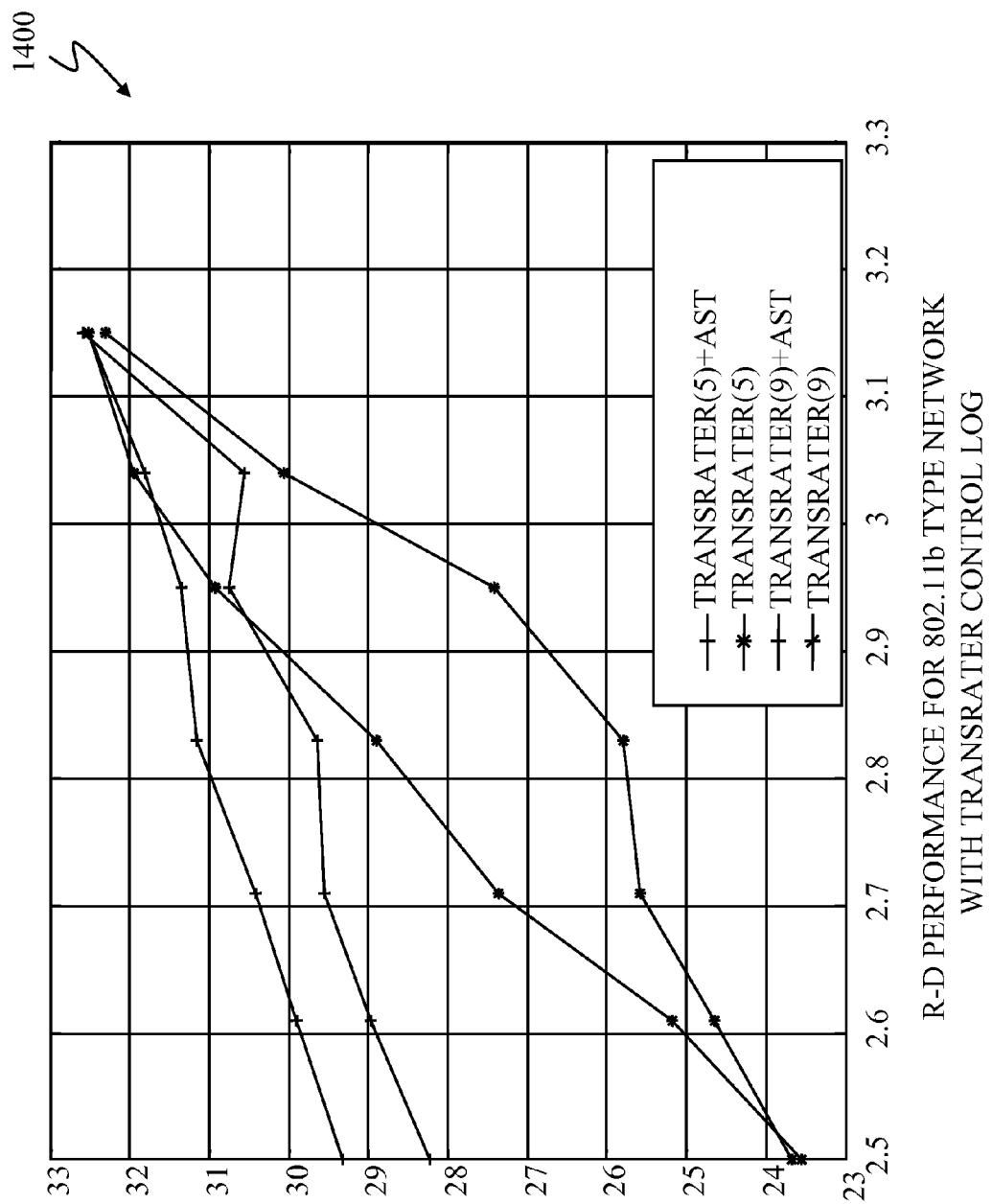

FIG. 14 shows another R-D performance 1400 for different transrater control lag values, e.g., 5 and 9 frames, for:
a) Transrating only and
b) Transrating+AST.

This experiment was performed over an 802.11b-type network. The exemplary source content is mobile, with CIF resolution, and 30 fps original sequence.

One of ordinary skill in the art will appreciate that various software or programming techniques may be applied to perform the process described herein, such as counters, flags, arrays, variables, and the like. Furthermore, embodiments of the present invention may be used in conjunction with networks, systems, and devices that stream source content. Although this invention has been disclosed in the context of certain embodiments and examples, it will be understood by those or ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of streaming a source content from a sender to a receiver via a network, wherein said source content comprises a plurality of content elements, the method comprising the steps of: determining, by the sender, a transmission rate; determining, in priority index order, a first set of content elements based on a rate constraint for the receiver, wherein said first set of content elements is associated with content elements of said source content within a transmission buffer, and wherein said rate constraint is based on said determined transmission rate; and determining, in transmission order, whether each of said content elements in said determined first set of content elements meets its associated delay constraint, and, if said content element does not meet its said associated delay constraint, identifying said content element not meeting its said associated delay constraint as a drop content element, and wherein said priority index order is based on at least one of the following: frame types associated with said content elements of said first set of content elements; an amount by which the distortion at the receiver is calculated to be decreased; an encoding scheme of said source content; and minimizing a coding dependency chain.

2. The method of claim 1, further comprising the step of: receiving, by the sender, one or more feedbacks; wherein the step of determining the transmission rate is based on information from said one or more feedbacks.

3. The method of claim 2, wherein the received one or more feedbacks comprise a current feedback and a previous feedback.

4. The method of claim 1, further comprising repeating all the steps of claim 1 until a stopping condition is met.

5. The method of claim 4, further comprising the step of: if said stopping condition is met, transmitting, in transmission order, a filtered set of content elements wherein said filtered set comprising content elements of said transmission buffer without any of said identified drop content elements.

6. The method of claim 1, further comprising the step of: transmitting, in transmission order, one or more content elements of a filtered set of content elements wherein said filtered set comprises content elements of said transmission buffer without any of said identified drop content elements.

7. The method of claim 6 wherein the step of transmitting, in transmission order, comprises transmitting only one content element identified first in said transmission order from said filtered set of content elements.

8. The method of claim 6, further comprising repeating all the steps of claim 1 and claim 2 every time a content element is adapted to be transmitted from the said transmission buffer.

9. The method of claim 1, further comprising repeating all the steps of claim 1 and claim 2 every time a content element is adapted to be transmitted from said transmission buffer.

10. The method of claim 1, wherein said rate constraint for the receiver is further based on a receiver buffer size.

11. The method of claim 10, wherein said step of determining said first set of content elements is based on an accumulated size value which is based on accumulating, in priority order, each content element size associated with each of said content elements within said transmission buffer, and wherein a maximum value of said accumulated size value is less than said rate constraint determined by the sender.

12. The method of claim 1, wherein said rate constraint for the receiver is further based on at least one of the following: an amount of outstanding data on said network; and a reported packet loss of said receiver.

13. The method of claim 1, wherein each of said associated delay constraint of said content element is based on a current time and a time to transmit said content element and one or more content elements prior in transmission order based on said determined transmission rate.

14. A device adapted to be operably coupled to a network, the device comprising: a transmission buffer adapted to store content elements associated with a source content, said source content comprising a plurality of content elements; a rate-determination module adapted to determine a transmission rate; a selective dropping module adapted to: determine, in priority index order, a first set of content elements based on a rate constraint for a receiver, wherein said first set of content elements is associated with said content elements of said transmission buffer, and wherein said rate constraint is based on said determined transmission rate determined by said rate-determination module; and determine, in transmission order, whether each of said content elements in said determined first set of content elements meets its associated delay constraint, and, if said content element does not meet its said associated delay constraint, identify said content element not meeting its said associated delay constraint as a drop content element; a buffer transmitter module adapted to transmit, in transmission order, one or more content elements of a filtered set of content elements, wherein said filtered set comprising content elements of said transmission buffer without said content elements associated with said identified drop content elements, and wherein said priority index order is based on at least one of the following: frame types associated with said content elements of said first set of content elements; an amount by which the distortion at the receiver is calculated to be decreased; an encoding scheme of said source content; and minimizing a coding dependency chain.

15. The device of claim 14, further comprising: a feedback module adapted to receive feedbacks from receivers; and wherein said rate-determination module is further adapted to determine said transmission rate based on one or more feedbacks from said received feedbacks.

16. The device of claim 15, wherein said received feedbacks from receivers comprise a current feedback and a previous feedback.

17. The device of claim 14 further comprising an encoder module adapted to encode said source content to a plurality of content elements.

18. The device of claim 14, wherein said rate constraint for said receiver is further based on at least one of the following: a receiver buffer size; an amount of outstanding data on said network; and a reported packet loss of said receiver.

19. The device of claim 14, wherein said selective dropping module is further adapted to determine said first set of content elements based on an accumulated size value which is based on accumulating, in priority order, each content element size associated with each of said content elements of said transmission buffer, and wherein a maximum value of said accumulated size value is less than said rate constraint of said receiver.

20. The device of claim 14, wherein each of said associated delay constraint of said content element is based on a current time and a time to transmit said content element and one or more content elements prior in transmission order based on said determined transmission rate.

21. A system comprising: a sender operably coupled to a receiver via one or more network segments, the sender comprising: a transmission buffer adapted to store content elements associated with a source content, said source content comprising a plurality of content elements; a rate-determination module adapted to determine a transmission rate; a selective dropping module adapted to: determine, in priority index order, a first set of content elements based on a rate constraint for said receiver, wherein said first set of content elements is associated with said content elements of said transmission buffer, and wherein said rate constraint is based on said determined transmission rate determined by said rate-determination module; and determine, in transmission order, whether each of said content elements in said determined first set of content elements meets its associated delay constraint, and, if said content element does not meet its said associated delay constraint, identify said content element not meeting its said associated delay constraint as a drop content element; a buffer transmitter module adapted to transmit to said receiver, in transmission order, one or more content elements of a filtered set of content elements, wherein said filtered set comprising content elements of said transmission buffer without said content elements associated with said identified drop content elements; and said receiver adapted to receive and present said filtered set of content elements, and wherein said priority index order is based on at least one of the following: frame types associated with said content elements of said first set of content elements; an amount by which the distortion at the receiver is calculated to be decreased; an encoding scheme of said source content; and minimizing a coding dependency chain.

22. The system of claim 21, further comprising: an encoder adapted to: encode said source content into said plurality of content elements; transmit said plurality of content elements to said sender.

23. The system of claim 21, wherein the sender further comprises: a feedback module adapted to receive feedbacks from receivers; and wherein said rate-determination module of said sender is further adapted to determine said transmission rate based on one or more feedbacks from said received feedbacks.

24. The system of claim 23, wherein said received feedbacks from receivers by said feedback module comprise a current feedback and a previous feedback.

25. The system of claim 21, wherein said selective dropping module of said sender is further adapted to determine said priority index order based on at least one of the following: frame types associated with said content elements of said first set of content elements; an amount by which the distortion at the receiver is calculated to be decreased; an encoding scheme of said source content; and minimizing a coding dependency chain.

* * * * *